US012654499B2

(12) United States Patent (10) Patent No.: US 12,654,499 B2
Gentner et al. (45) Date of Patent: Jun. 16, 2026

(54) DEVICE FOR PULLING A TRAILER AND/OR RETAINING A LOAD CARRYING UNIT

(71) Applicant: ACPS Automotive GmbH, Ingersheim (DE)

(72) Inventors: Wolfgang Gentner, Steinheim (DE); Galib Krdzalic, Tamm (DE)

(73) Assignee: ACPS Automotive GmbH, Ingersheim (DE)

( * ) Notice: Subject to any disclaimer, the term of this patent is extended or adjusted under 35 U.S.C. 154(b) by 899 days.

(21) Appl. No.: 17/715,736

(22) Filed: Apr. 7, 2022

(65) Prior Publication Data

US 2022/0227190 A1 Jul. 21, 2022

Related U.S. Application Data

(63) Continuation of application No. 16/184,315, filed on Nov. 8, 2018, now Pat. No. 11,331,969, which is a (Continued)

(30) Foreign Application Priority Data

May 9, 2016 (DE) ..................... 10 2016 108 541.3

(51) Int. Cl.
 *B60D 1/24* (2006.01)
 *B60D 1/06* (2006.01)
(52) U.S. Cl.
 CPC ................ *B60D 1/248* (2013.01); *B60D 1/06* (2013.01)
(58) Field of Classification Search
 CPC .................................................... B60D 1/248
 See application file for complete search history.

(56) References Cited

U.S. PATENT DOCUMENTS

| 4,319,766 A | 3/1982 | Corteg et al. |
| 6,053,521 A | 4/2000 | Schertler |

(Continued)

FOREIGN PATENT DOCUMENTS

| DE | 36 17 426 C1 | 9/1987 |
| DE | 3833418 A1 | 4/1990 |

(Continued)

*Primary Examiner* — Kevin Hurley
(74) *Attorney, Agent, or Firm* — Reinhart Boerner Van Deuren P.C.

(57) ABSTRACT

In order to improve a device for pulling a trailer and/or retaining a load carrying unit that is mountable at the rear end of a motor vehicle body and which comprises a supporting arm that is connected by a first end region to the motor vehicle body and is provided at a second end region with an element for attaching the trailer and/or for fixing the load carrying unit and furthermore which comprises sensors for capturing reversible deformations of the supporting arm caused by loads on the supporting arm in such a manner as to provided a device with which an allocation of captured elongations to individual applications of force is possible in as simple a way as possible, it is proposed that strain sensors which are affected by reversible deformations thereof be assigned to a supporting arm section of the supporting arm, and that, for capturing at least one selected bending strain, at least one strain sensor be arranged on one side and at least one strain sensor on an opposite side of a surface region of a neutral reference surface assigned to the selected bending load and that each of the strain sensors be arranged at a distance from this surface region.

15 Claims, 25 Drawing Sheets

Related U.S. Application Data continuation of application No. PCT/EP2017/060563, filed on May 3, 2017.

(56)                    References Cited

U.S. PATENT DOCUMENTS

| | | | |
|---|---|---|---|
| 6,705,684 B1 | 3/2004 | Garvey | |
| 8,966,998 B2* | 3/2015 | Gentner | G01L 1/12 |
| | | | 73/862.621 |
| 9,464,953 B2* | 10/2016 | Wirthlin | G01L 5/136 |
| 10,406,872 B2* | 9/2019 | Scheips | G01L 1/127 |
| 12,134,287 B1* | 11/2024 | McAllister | G01L 5/136 |
| 12,194,795 B2* | 1/2025 | McAllister | G01G 19/02 |
| 12,311,709 B2* | 5/2025 | McAllister | B60D 1/62 |
| 2005/0006946 A1* | 1/2005 | Traechtler | B60D 1/065 |
| | | | 303/7 |
| 2005/0160837 A1 | 7/2005 | Tellenbach et al. | |
| 2013/0080078 A1 | 3/2013 | Wirthlin | |
| 2013/0091962 A1 | 4/2013 | Gentner et al. | |
| 2013/0253814 A1* | 9/2013 | Wirthlin | B60D 1/62 |
| | | | 701/1 |
| 2017/0015163 A1 | 1/2017 | Sielhorst | |
| 2017/0305215 A1 | 10/2017 | Scheips et al. | |
| 2018/0067003 A1 | 3/2018 | Michiwaki | |
| 2019/0293506 A1 | 9/2019 | Brütt et al. | |
| 2024/0416695 A1* | 12/2024 | Doman | G01G 19/02 |
| 2025/0074125 A1* | 3/2025 | Holz | B60D 1/248 |

FOREIGN PATENT DOCUMENTS

| | | | | |
|---|---|---|---|---|
| DE | 10 2013 007 727 A1 | 11/2014 | | |
| DE | 10 2014 013 812 A1 | 3/2016 | | |
| DE | 102024001433 A1 * | 3/2025 | | G01L 5/136 |
| EP | 1 199 547 A2 | 4/2002 | | |
| EP | 2 567 837 A1 | 3/2013 | | |
| EP | 2801488 A1 * | 11/2014 | | B60D 1/62 |
| EP | 3517327 A1 * | 7/2019 | | B60D 1/248 |
| EP | 3932702 A1 * | 1/2022 | | B60D 1/54 |
| GB | 2633105 A * | 3/2025 | | G01G 19/12 |
| NL | 1024538 C1 | 4/2005 | | |

* cited by examiner

DEVICE FOR PULLING A TRAILER AND/OR RETAINING A LOAD CARRYING UNIT

CROSS-REFERENCE TO RELATED PATENT APPLICATIONS

This patent application is a continuation of U.S. patent application Ser. No. 16/184,315, filed Nov. 8, 2018, which is a continuation of PCT/EP2017/060563, filed May 3, 2017, which claims priority to German Application No. 10 2016 108 541.3, filed May 9, 2016, the entire teachings and disclosure of which are incorporated herein by reference thereto.

BACKGROUND OF THE INVENTION

The invention relates to a device for pulling a trailer and/or retaining a load carrying unit which is mountable at the rear end of a motor vehicle body and comprises a supporting arm that is connected to the motor vehicle body by a first end region and is provided at a second end region thereof with an element for attaching the trailer and/or for fixing the load carrying unit, and furthermore comprising sensors for detecting reversible deformations of the supporting arm caused by loads on the supporting arm.

A device of this type is known from DE 10 2014 013 812 A1 for example.

In the case of this device however, it is not possible to assign the elongations captured by a plurality of sensors located at different positions of the supporting arm to the individually applied forces in a simple manner.

Consequently, the object of the invention is to provide a device in which it is possible to allocate captured elongations to individually applied forces in as simple a manner as possible.

SUMMARY OF THE INVENTION

In accordance with the invention, this object is achieved in a device of the type described hereinabove in that strain sensors which are affected by reversible deformations thereof are assigned to a supporting arm section of the supporting arm, and in that, for capturing at least one selected bending load, at least one strain sensor is arranged on one side and at least one strain sensor is arranged on an opposite side of a surface region of a neutral reference surface assigned to the selected bending load and in that the strain sensors are each arranged at a distance from this surface region.

The distance of the respective strain sensor from the surface region is at least 2 mm, more preferably at least 4 mm, preferably at least 6 mm for example.

The advantage of the solution in accordance with the invention is thus to be seen in that, due to the arrangement of at least one strain sensor on mutually opposite sides of the surface region of the neutral reference surface, it is possible to capture the selected elongation in that the strain sensors arranged on the different sides of the neutral reference surface capture elongations of different prefix sign, i.e. once in the form of an elongation and once as a compressive distortion and thus the contribution of the bending load to the elongations measured by the strain sensors can be more simply determined.

Furthermore, it is particularly advantageous that the strain sensors are located on differing mutually opposite sides of a surface region of the neutral reference surface, i.e. a partial surface area of the neutral reference surface, so that the strain sensors thereby capture the reversible deformations implemented by the same volume region of the supporting arm in one instance as an elongation and then as a compressive distortion.

In one solution in accordance with the invention, a neutral reference surface is to be understood as being that surface which, on the one hand, runs through the neutral axis in the supporting arm that is formed in the case of the selected bending load, and which on the other hand extends transversely to a bending movement surface.

Hereby, a bending movement surface in the sense of the solution in accordance with the invention is to be understood as being that surface parallel to which the supporting arm moves with the smallest amount of transverse movement relative to this surface in the event of a bending load triggered by an application of force in a single defined direction and which runs through the neutral axis of the supporting arm that ensues in the case of this bending load.

In accord with an approximation, the bending movement surface runs parallel to the direction in which the force is applied and through the respective neutral axis.

Furthermore, as a rough approximation, the vertical bending movement surface in the case of a curved supporting arm is a surface running centrally through every section of the supporting arm and approximately parallel to the direction of the vertical application of force.

An approximately parallel path is to be understand in particular as being a path which deviates from an exactly parallel path by up to a maximum of ±30° but more preferably maximally ±20°.

If it is necessary within the framework of the device in accordance with the invention to capture a plurality of bending loads, then a neutral reference surface is assigned to each bending load.

In particular, there is provided in the context of the solution in accordance with the invention to subject the supporting arm to a vertical bending load and a transverse bending load, whereby in the case of a vertical bending load a vertical neutral reference surface is formed and in the case of a transverse bending load a transverse neutral reference surface is formed.

Up to now, no particular details in regard to the surface region of the respective neutral reference surface and the relative arrangement of the strain sensors to this surface region have been given.

Thus, it is expedient if a vertical projection of the strain sensors that are arranged on mutually opposite sides of the neutral reference surface onto the surface region lies within this surface region. That is to say, that the projection of each of the strain sensors onto this surface region lies within it.

Furthermore, the position of the strain sensors relative to each other is given yet more precisely in that, in each of its directions of extent, the surface region has an extent which is maximally double, still better maximally 1.5 times the extent of each of the strain sensors which is parallel to this direction of extent.

That is to say that, in regard to the extents thereof in the directions of extent lying within the neutral reference surface, the surface region is bounded in order to achieve the effect that the strain sensors are arranged relative to each other in substantially mirror-like manner at the neutral reference surface and are not offset by any significant amount in one direction of extent of the neutral reference surface so that it is thereby ensured that the elongations or compressive distortions of the self-same volume region are captured on opposite sides of the neutral reference surface.

Furthermore, provision is preferably made for the strain sensors that are arranged on mutually opposite sides of the respective neutral reference surface to be arranged at distances from the respective neutral reference surface which are such that the distances of the at least one strain sensor on one side of the surface region of the neutral reference surface lies in a range of from 0.5 times up to 1.5 times, more preferably in the range of from 0.7 times up to 1.3 times the distance of the at least one strain sensor on the opposite side of the surface region.

It is thereby ensured that the distances from this surface region of the strain sensors assigned to the respective surface region do not differ too greatly so that it can thereby be ensured that the elongations or compressive distortions captured by the strain sensors lie in the same order of magnitude.

This has the advantage that the signals produced by the strain sensors can thereby be assigned to the respective bending load in a simplified manner due to their different prefix sign.

A particularly simple arrangement of the strain sensors envisages that they be aligned approximately parallel to the surface region of the neutral reference surface.

Hereby, an approximately parallel alignment is to be understood as meaning that the alignment of the strain sensors deviates by maximally ±20°, more preferably by maximally ±10° from exactly parallel alignment with the surface region of the neutral reference surface.

For example, there is provided in this context for the strain sensors to be arranged on sensor carrier surfaces running approximately parallel to the surface region and to be connected thereto.

Within the framework of the embodiments of the device in accordance with the invention described so far, no particular details of the selected bending load have been specified.

It is particularly expedient, if the selected bending load is caused by a force on the element in the vertical direction and if the neutral reference surface arising thereby is a vertical neutral reference surface.

A force on the element in the vertical direction is to be understood as being a force which is effective on the element when the device in accordance with the invention is mounted on a motor vehicle body and the motor vehicle is standing on a horizontal carriageway.

A force in the vertical direction of this type is usually called a hitching-load which is preferably determined using a static measurement in the case of a device in accordance with the invention, i.e. when the vehicle is not being driven.

In the case of the device in accordance with the invention, a hitching-load of this type causes, in particular exclusively, a bending load of the supporting arm due to the distance of the element for pulling a trailer and/or retaining a load carrying unit from the first end region of the supporting arm which is connected to the motor vehicle body, whereby, due to the solution in accordance with the invention, this load can be captured in a simple manner in the form of a static measurement, i.e. when the vehicle is not being driven, and in particular can be differentiated in a simple way from a tensile load whilst the vehicle is being driven along.

However, in order to also be in a position to capture tensile loads that are effective on the element in the case of the device in accordance with the invention, provision is preferably made for the strain sensors to be arranged and aligned in such a manner that they capture a horizontal tensile load by a horizontal longitudinal force on the element.

A horizontal longitudinal force on the element is to be understood here as being a force which acts on the element horizontally and in the longitudinal direction of the vehicle in the case of a device in accordance with the invention that is mounted on a vehicle body and with the motor vehicle standing on a horizontal carriageway.

A horizontal longitudinal force of this type is usually called a tensile force which is likewise of relevance in the case of a device in accordance with the invention.

In particular, the determination of a tensile force of this type serves for the determination of a trailer mass, if, in the case of a vehicle, apart from the tensile force, the acceleration in the horizontal longitudinal direction as captured by an acceleration sensor for example is also known.

To this end in particular, dynamic measurements of the forces acting on the trailer or the load carrying unit are effected.

It is particularly expedient for the measurement of the horizontal tensile load, if the section of the supporting arm is selected in such a manner that the neutral reference surface of this section of the supporting arm comprises a component in a horizontal longitudinal direction, in particular a longitudinal direction of the vehicle, and in particular, a significant component in the horizontal longitudinal direction.

Preferably thereby, there is provided for the neutral reference surface of this supporting section to run substantially parallel to the horizontal longitudinal direction.

A substantially parallel path of the neutral reference surface relative to the horizontal longitudinal direction is to be understood here as meaning that the path deviates from an exactly parallel path by an angle of less than ±30°, preferably an angle of less than ±20°.

As an alternative or in addition to the features described above, there is provided in accordance with the invention in the case of a device of the type described hereinabove for the solution of the object specified hereinabove to be achieved in that a sensor unit comprises a sensor carrier which is provided on mutually opposite sides with sensor carrier surfaces upon which strain sensors are arranged and connected thereto, and in that the sensor carrier is connected to a deformable supporting section of the supporting arm in such a manner that the sensor carrier displays a reversible deformation behaviour which is qualitatively identical to the reversible deformation behaviour of the section of the supporting arm.

This solution has the advantage that the possibility was thereby created of not arranging the strain sensors directly on the supporting arm but rather, on a sensor carrier which is connected to a supporting arm section of the supporting arm in such a manner that it qualitatively displays the same elongation behaviour as the section of the supporting arm.

This thereby offers the possibility on the one hand of capturing the reversible deformation behaviour of the section of the supporting arm but, for the purposes thereof on the other hand, a sensor carrier can be employed which can be formed independently of the supporting arm, while the supporting arm is to be formed in such a way that it withstands the loads arising in use of the device in accordance with the invention.

In particular thereby, the sensor carrier is arranged relative to the section of the supporting arm in such a manner that, for capturing a selected bending load, a neutral reference surface of the supporting region assigned to this bending load passes through a volume region of the sensor carrier lying between the sensor carrier surfaces.

In the case of this arrangement of the sensor carrier, it is thus ensured that the strain sensors located on the sensor carrier surfaces are able to capture the pure bending loads in that the strain sensor on one side of the neutral reference surface experiences an elongation and the strain sensor on the other side of the neutral reference surface experiences a compressive distortion.

Particularly favorable, is an arrangement of the sensor carrier relative to the section of the supporting arm in which the neutral reference surface intersects a central volume region of the sensor carrier so that the spacing of the at least one strain sensor on the one side to the neutral reference surface thereby corresponds approximately to the spacing of the strain sensor on the other neutral reference surface.

The elongations can be captured in a particularly expedient manner if the sensor carrier extends substantially along the neutral reference surface.

An extension substantially along the neutral reference surface is to be understood as meaning that the extension can deviate from an exactly parallel path by maximally ±30°.

In particular, the sensor carrier is formed in such a way that it extends in the direction of a longitudinal central axis in bar-shaped or plate-like manner for example and in this case in particular, there is provided for the sensor carrier surfaces to be arranged on mutually opposite sides of a longitudinal central axis of the sensor carrier.

In particular, provision is likewise made in the case of this solution for the mutually opposite sensor carrier surfaces to each be at distances from the neutral reference surface which differ from each other by a factor in the range of 0.5 to 1.5 in order to thus ensure that the distances from the neutral reference surface of the strain sensors arranged on mutually opposite of the neutral reference surface are of the same order of magnitude, are approximately equally large.

As has already been explained above, the sensor carrier should not have any significant effect on the reversible deformation behaviour of the supporting region whose reversible deformation behaviour should qualitatively reproduce that of the sensor carriers.

For this reason, provision is preferably made for the sensor carrier to have an effect on the reversible deformation behaviour of the supporting arm region to which it is connected that is so small that the magnitudes of the reversible deformations of the supporting arm region arising when the sensor carrier is present amount to at least 0.90 times, preferably at least 0.95 times the magnitude of the reversible deformation of the supporting arm region without the sensor carrier.

That is to say, the sensor carrier makes an insignificant contribution to the stiffness of the section of the supporting arm to which it is connected and thus the possibility also exists of forming the sensor carrier independently of the formation of the section of the supporting arm with the requisite stiffness.

In the simplest case, the sensor carrier can be formed such that it is connected to the section of the supporting arm in one-piece manner whereby, in this case, the sensor carrier should not make any or make only an insignificant contribution to the stiffness of the section of the supporting arm so that a large degree of freedom is thereby provided in regard to the formation of the sensor carrier and the arrangement of the strain sensors on the sensor carrier.

As an alternative to a one-piece formation of the sensor carrier on the section of the supporting arm, a further advantageous solution envisages that the sensor carrier be a component that is mountable on a section of the supporting arm in releasable manner.

In this case, the sensor carrier can be formed independently of the section of the supporting arm and can also be replaced in the event of damage.

Furthermore, this solution has the great advantage that the sensor carrier can thereby be manufactured with the strain sensors as a single unit and can be employed for different supporting arms.

In principle, this solution creates the possibility of making the sensor carrier of a material that differs from the material of the section of the supporting arm.

However, in order to produce as similar a thermal expansion behaviour as possible, there is provided for the sensor carrier to consist of a material having the same coefficient of thermal expansion as the section of the supporting arm and in particular to be of the same material as the supporting section so that a change of temperature cannot cause thermal stresses in the sensor carrier due to a different thermal expansion.

Furthermore, provision is preferably made for the sensor carrier to have mutually spaced end regions and for the sensor carrier surfaces for the strain sensors to be located between the end regions so that the sensor carrier extends beyond the sensor carrier surfaces by at least the end regions.

In principle, it is conceivable to connect the sensor carrier to the section of the supporting arm over its entire extent in the direction parallel to the neutral reference surface.

It has however proved to be advantageous if only the end regions of the sensor carrier are held in the seatings arranged in the section of the supporting arm which transmit the reversible deformations occurring in the section of the supporting arm due to the loads thereon to the sensor carrier so that, in particular, the section of the sensor carrier comprising the sensor carrier surfaces is only coupled to the section of the supporting arm by the end regions.

In order to enable the reversible deformations of the section of the supporting arm to be transmitted to the sensor carrier in a simple way, provision is preferably made for the end regions to engage in these seatings in the section of the supporting arm which fix the end regions in positive-locking manner and which transmit to the sensor carrier the reversible deformations of the section of the supporting arm that comprises the seatings and in addition extends between the seatings.

That is to say that in this case, due to the positive-locking connection between the seatings and the section of the supporting arm and the end regions of the sensor carrier, a simple qualitative transmission of the reversible deformations of the section of the supporting arm to the sensor carrier is possible.

In particular, it is favorable if the seatings comprise seating surfaces which have at least one component that extends parallel to the respective neutral reference surface and acts on the end regions.

In regard to the transmission of the reversible deformation behaviour of the section of the supporting arm to the sensor carrier, it is particularly expedient if the end regions comprise positive-locking surfaces having at least one component extending parallel to the respective neutral reference surface so that, in particular, an advantageous transmission of the reversible deformation behaviour from the section of the supporting arm to the sensor carrier is effected via this positive-locking arrangement.

Within the framework of the previous explanation of the individual exemplary embodiments, no particular details of how the sensor carrier should run relative to the section of the supporting arm have been given.

The basic requirement is however, that the sensor carrier for the respective bending load that is to be captured should exhibit the same elongation behaviour as the section of the supporting arm.

In particular, apart from the bending loads, in order to also enable horizontal tensile loads in the longitudinal direction and in particular in the longitudinal direction of the vehicle to be captured, provision is preferably made for the sensor carrier and in particular the longitudinal central axis thereof to have at least one component which extends in a horizontal longitudinal direction.

The horizontal longitudinal direction is likewise to be understood—as already mentioned above—as being a horizontal longitudinal direction in the case of a motor vehicle having the device in accordance with the invention mounted thereon standing on a horizontal carriageway.

It is particularly expedient if the sensor carrier extends substantially parallel to the horizontal longitudinal direction, whereby a substantially parallel extension relative to a horizontal longitudinal direction is to be understood as being a deviation of ±30°, preferably of ±20° from an exactly parallel path relative to the horizontal longitudinal direction.

In particular, the horizontal longitudinal direction is a horizontal direction running parallel to the longitudinal direction of the vehicle.

Up to now, no particular details in regard to the arrangement of the sensor carrier relative to the section of the supporting arm itself have been given.

Thus, one advantageous solution envisages that the sensor carrier be arranged beside the section of the supporting arm and offset in a direction parallel to the respective neutral reference plane.

For example, this is effected in that the sensor carrier is arranged at a long side of the section of the supporting arm.

Another advantageous solution envisages that the section of the supporting arm comprise a recess and that the sensor carrier be arranged such as to engage in the recess in the section of the supporting arm.

It is not necessary for the sensor carrier to engage entirely in the recess in the section of the supporting arm, in particular, it suffices for the advantageous formation of the seatings for the end regions of the sensor carrier, if the sensor carrier only partly engages in the recess in the section of the supporting arm.

Up to now, no particular details in regard to the location of the section of the supporting arm have been given.

Thus, one advantageous solution envisages that the section of the supporting arm as measured along the selected neutral reference surface be at a distance from the first end region which lies in the range of from 0.3 times up to 2 times the distance from the second end region.

A particularly expeditious solution envisages that a curved piece be provided between an intermediate region of the supporting arm comprising the section of the supporting arm and the first end region and/or the second end region of the supporting arm.

Moreover, one expeditious solution envisages that the section of the supporting arm lies in a central region between the first end region and the second end region of the supporting arm.

Up to now, no particular details in connection with the strain sensors that are employed have been given.

In principle, any kind of strain sensor is usable.

A particularly expedient solution however envisages that the strain sensors comprise strain gauges.

In order to exclude temperature effects, provision is preferably made for the strain sensors to be temperature-compensated.

One possible realization of a temperature-compensated strain sensor envisages that it comprise a plurality of strain gauges, four for example, which are interconnected in a bridge circuit, for example, in a Wheatstone bridge circuit.

Likewise up to now, no particular details in regard to the evaluation of the sensor signals have been given.

Thus within the scope of the solution in accordance with the invention, it would be conceivable for an evaluating unit to be provided in the motor vehicle.

One particularly expedient solution however envisages that an evaluating unit which evaluates the signals of the strain sensors be provided on the device itself.

This has the advantage that the signals of the strain sensors do not then have to be passed on over large distances and thus be subjected to further interference effects.

Preferably hereby, provision is made for the evaluating unit to be arranged on the carrier unit or on the supporting arm.

In the case where use is made of a sensor carrier, the evaluating unit is preferably provided on the sensor carrier so that the strain sensors provided directly on the sensor carrier can be connected to the evaluating unit and thus the sensor unit itself also comprises the evaluating unit so that the sensor unit is employable and in particular mountable as an independent unit on the respective supporting arm.

In this manner, the evaluating unit can work in the most varied of manners.

One solution envisages that the evaluating unit determines the force acting on the element in the vertical direction.

A further advantageous solution envisages that the evaluating unit determines a horizontal transverse force.

A further advantageous solution envisages that the evaluating unit determines a horizontal longitudinal force.

Furthermore in particular, it is of advantage for the solution in accordance with the invention if an acceleration sensor is assigned to the evaluating unit.

The acceleration sensor can be arranged on either the carrier unit or the supporting arm independently of the evaluating unit.

A particularly expedient solution however envisages that the acceleration sensor be provided in the evaluating unit.

In principle, the acceleration sensor can capture a multiplicity of accelerations.

For example, the accelerations can be in the vertical direction and in the horizontal transverse direction.

A particularly expedient solution envisages that the acceleration sensor capture at least one acceleration in the horizontal longitudinal direction since in this case it is then possible to determine the mass of the trailer attached to the element or of the load carrying unit attached to the element by taking into consideration the horizontal longitudinal force, i.e. in particular the tensile force and the acceleration in the horizontal longitudinal direction.

A particularly advantageous solution envisages that the supporting arm be a ball neck which carries a coupling ball at its second end as an element for attaching a trailer and/or fixing a load carrying unit.

Further features and advantages of the invention form the subject matter of the following description as well as the drawings of some exemplary embodiments.

BRIEF DESCRIPTION OF THE DRAWINGS

FIG. 9 an enlarged view of the second exemplary embodiment in the direction of the arrow B in FIG. 8;

FIG. 18 an enlarged side elevational view of the supporting arm in accordance with FIG. 17;

DETAILED DESCRIPTION OF THE INVENTION

Figure 1:
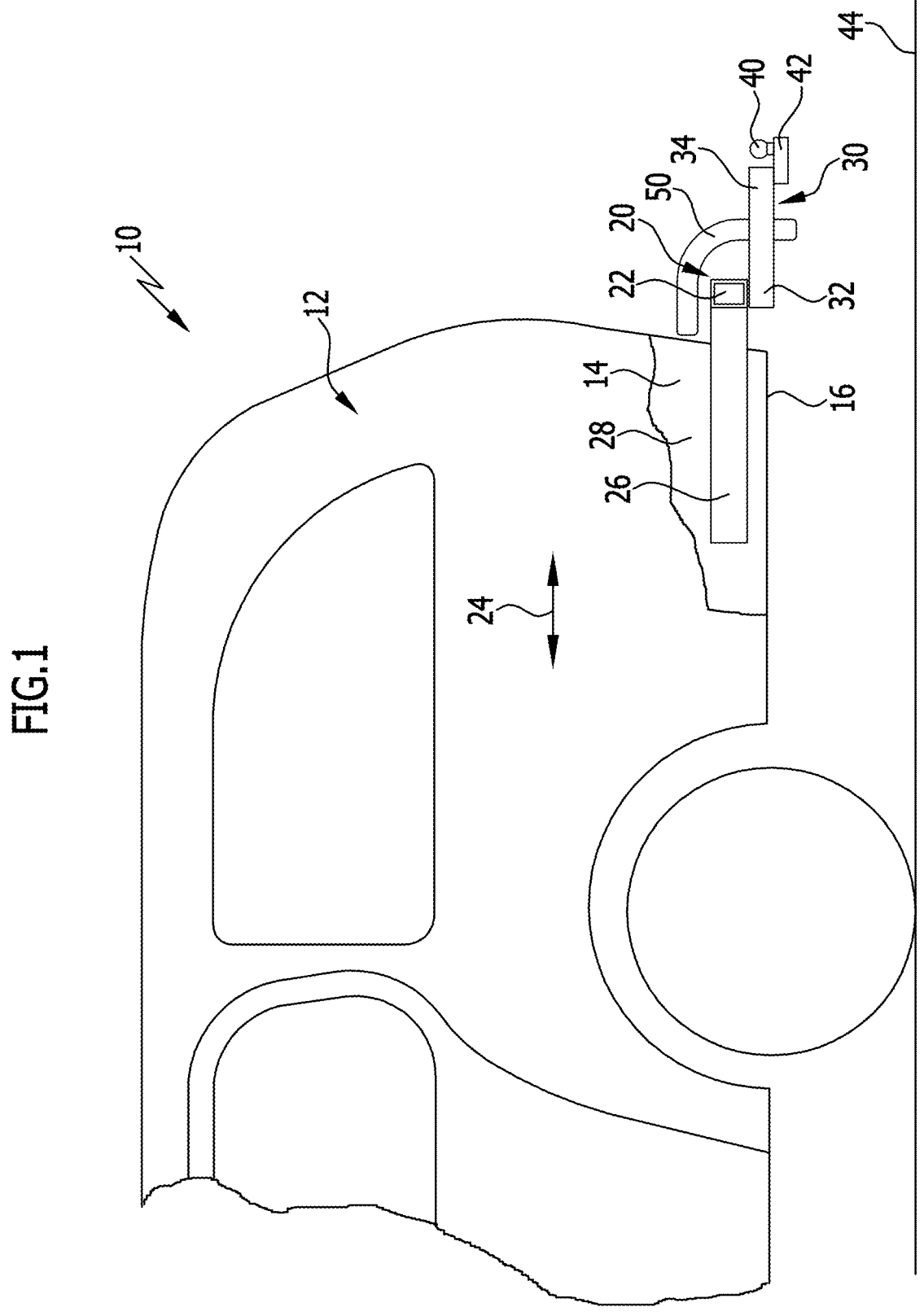
FIG. 1 shows a side view of a motor vehicle with a first exemplary embodiment of a device in accordance with the invention.

A motor vehicle that is referenced 10 as a whole comprises a motor vehicle body 12 which is provided with a carrier unit 20 in a tail region 14 namely, close to a floor 16 of the vehicle wherein the carrier unit comprises a cross beam 22 for example which is connected to the tail region 14 close to the floor 16 of the vehicle.

The connection between the cross beam 22 can, for example, be effected by mounting flanges located in the tail region 14 or for example, by means of side members 26 which extend in a longitudinal direction 24 of the vehicle and, as is known, are likewise located on sections 28 of the vehicle body that extend in the longitudinal direction 24 of the vehicle.

A supporting arm that is referenced 30 as a whole is connected to the carrier unit 20 in that a first end 32 of the supporting arm is held either directly or by a bearing unit on the carrier unit 20.

In the first exemplary embodiment of the supporting arm 30 that is illustrated in FIG. 1, there is a direct connection of the first end 32 of the supporting arm 30 to the cross beam 22.

The supporting arm 30 carries at a second end 34 thereof located opposite the first end 32 an element 40 which is provided for attaching a trailer or for fixing a load carrying unit for example.

For example, seen here is an element 40 of this type in the form of a coupling ball which, as is usually the case, permits connection to a ball joint coupling of a trailer.

However, the coupling ball also permits the simple mounting of a load carrying unit since commonly used load carrying units are likewise frequently constructed such that they are mountable on a coupling ball 40 and, in addition, they are also supportable on the supporting arm 30 if necessary.

The element 40 sits for example on a carrier 42 which is connected to the second end region 34 of the supporting arm 30 and extends away from a side of the carrier 42 remote from a carriageway 44 in the direction of a central axis 46 which runs approximately vertically when the carriageway 44 is horizontal and also runs through a central point 48 of the ball in the case of the coupling ball.

For improving the aesthetic effect, the cross beam 22 is preferably arranged under a rear-end bumper unit 50 of the motor vehicle body 12 whereby for example, the bumper unit 50 covers the cross beam 22 and the first end 32 of the supporting arm 30.

In the first exemplary embodiment, the supporting arm 30 is illustrated schematically as being a rectangular bar although the supporting arm 30 can be of any arbitrary shape as will be evident from the following exemplary embodiments.

The illustration of the supporting arm 30 in the form of a rectangular bar in connection with the first exemplary embodiment makes it possible to also illustrate in a simplified manner the relationships that are essential for the invention when the element 40 is loaded by forces acting in different directions and the reversible deformations resulting therefrom.

In the case of the element 40 being loaded by a vertical force FZ which is effective on the element 40 in the vertical direction and corresponds to the hitching-load of a trailer or a load carrying unit that is acting on this element 40 then, for example, a bending load of the supporting arm 30 occurs when the force FZ acts on the element 40 from above in the direction of the force of gravity as a result of which there occurs a reversible bending of the supporting arm 30 in the direction of the carriageway 44. This builds up, in particular, in a section 60 of the supporting arm that is located between the first end 32 and the second end 34 which is unaffected by the connection between the first end 32 of the supporting arm 30 and the cross beam 22 and is also unaffected by the connection of the second end 34 of the supporting arm 30 to the element 40, for example, to a carrier 42 for the element 40.

The force FZ effective in the vertical direction and in the direction of the force of gravity thus produces a vertical bending load at least in the section 60 of the supporting arm. This leads to the section 60 of the supporting arm being stretched on an upper transverse side 62 thereof taken with respect to the gravitational force and experiencing compressive distortion on a lower transverse side 64 taken with respect to the direction of the force of gravity so that material bending stresses $MBS_Z$ caused by the bending moment occur close to the upper transverse side 62, whilst material bending stresses $-MBS_Z$ which are due to the material compressive distortions at the lower transverse side 64 occur close to the lower transverse side 64 of the section of the supporting arm.

Consequently, due to the material distortions $MBS_Z$ and $-MBS_Z$ being of opposite sign, a so-called neutral axis that is referred to hereinafter as the vertical neutral axis NFV in which no material stresses and thus no elongation and no compressive distortion of the material arises is formed therebetween in the presence of a vertical bending loading BV.

Figure 4:
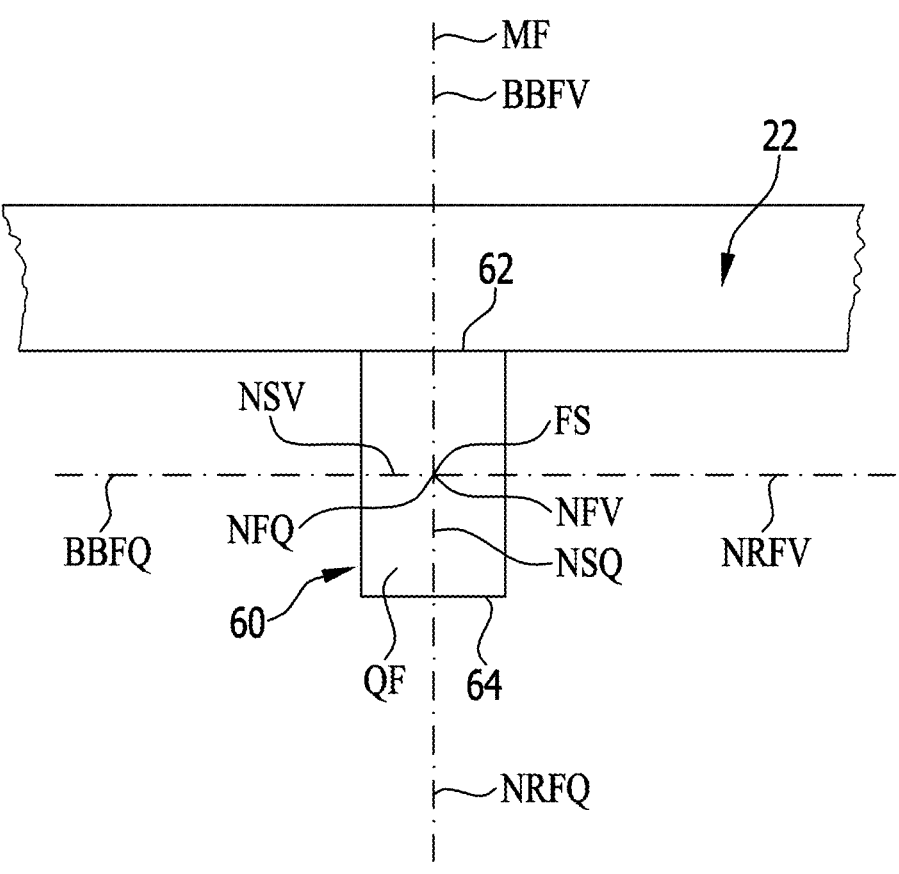
FIG. 4 a section along the line 4-4 in FIG. 2.

Usually, as illustrated in FIG. 4, the vertical neutral axis NFV is located in the centroid FS of any cross-sectional area QF of the section 60 of the supporting arm and thus, for example, to a first approximation centrally between the upper transverse side 62 and the lower transverse side 64.

In the case where the force FZ is directed exclusively in the vertical direction, the section 60 of the supporting arm comprises a vertical neutral layer NSV which extends over the entire width of the section 60 of the supporting arm and is determined by a vertical neutral reference surface NRFV which runs on the one hand through the vertical neutral axis NFV and, in a direction transverse to the vertical neutral axis NFV, runs in particular perpendicularly to the vertical neutral axis NFV and in particular too, perpendicularly to a bending movement surface BBFV that is formed in the presence of the vertical bending load BV.

The vertical bending movement surface BBFV is defined as the surface which runs through the neutral axis NFV and parallel to which the section 60 of the supporting arm moves the least possible and in particular without any transverse movements in the presence of the vertical bending loading BV.

In particular, the vertical neutral reference surface NRFV runs, to an approximation, perpendicularly to a central surface MF of the section 60 of the supporting arm which is parallel to the vertical and runs through a respective centroid FS of each cross-sectional area QF of the section 60 of the supporting arm and thus through the vertical neutral axis NFV.

If, by contrast, a load is imposed on the element 40 by a horizontal transverse force FY that is aligned perpendicularly to the vertical force FZ and, for example, also runs perpendicularly to the central surface MF, then bending of the supporting arm 60 occurs which is such that a material elongation and thus a positive material bending stress $MBS_Y$ occurs on a long side 66 which extends between the upper transverse side 62 and the lower transverse side 64, whereas on the oppositely located long side 68 which likewise extends between the upper transverse side 62 and the lower transverse side 66 there is a material compressive distortion and thus a negative material bending stress $-MBS_Y$.

A transverse bending loading BQ of this type likewise leads to the formation of a transverse neutral axis NFQ which coincides with the neutral axis NFV in the case of the exemplary embodiment illustrated in accord with FIG. 4 due to the symmetrical construction of the section 60 of the supporting arm.

This, however, is not necessarily the case. In the event of the section 60 of the supporting arm having an asymmetrical construction, the neutral axis NFQ can run in a different manner and be located elsewhere than the neutral axis NFV.

When loaded by the horizontal transverse force FY, a transverse neutral layer NSQ is likewise formed in the section 60 of the supporting arm in which there is no elongation or compressive distortion of the material and thus too no material stresses MS occur.

Hereby, the neutral layer NSQ extends in a transverse neutral reference surface NRFQ running perpendicularly to the horizontal transverse force FY which, for example, coincides with the central surface MF in the case of this simplified exemplary embodiment.

However, in the case where the transverse neutral reference surface NRFQ does not coincide with the central surface MF, the transverse neutral reference surface NRFQ runs on the one hand through the transverse neutral axis NFQ and moreover, perpendicularly to a transverse bending movement surface BBF which runs through the neutral axis NFQ and parallel to which the section 60 of the supporting arm moves with the lowest possible and in particular without any transverse movements in the presence of the transverse bending loading BQ.

In addition, for example, the transverse neutral reference surface NRFQ also runs perpendicularly to the vertical neutral reference surface NRFV, this being due to the fact that the vertical force FZ and the horizontal transverse force FY run perpendicularly to each other.

In addition, a tensile loading of the element 40 can be produced by a horizontal longitudinal force FX which correspond to an acceleration force that runs perpendicularly to the vertical force FZ and perpendicularly to the horizontal transverse force FY and for example, is directed away from the tail region 14 of the motor vehicle body 12 so that, due to the horizontal longitudinal force FX, tensile stresses $MZS_X$ are formed in the section 60 of the supporting arm which however run parallel to each other and in the same direction over the respective cross-sectional areas QF and, to a first approximation, are equally large, whereby the horizontal longitudinal force FX is preferably aligned approximately parallel to the longitudinal direction 24 of the vehicle when the motor vehicle 10 is travelling on a horizontal carriageway.

In the simplified first exemplary embodiment, the supporting arm 30 is aligned in such a way that it runs horizontally and in parallel with the longitudinal direction 24 of the vehicle so that the horizontal longitudinal force FX leads exclusively to uniform material elongation over the respective cross-sectional area QF and thus to equally large material stresses $MZS_X$.

Hereby, the load carrying unit 20, the supporting arm 30 and the element 40 form a device 70 in accordance with the invention for pulling a trailer and/or retaining a load carrying unit.

For collecting the reversible deformation data of the section 60 of the supporting arm resulting from the differing loads imposed by the vertical force FZ, the horizontal transverse force FY and the horizontal longitudinal force FX in the first exemplary embodiment, the supporting arm 30 is provided in the section 60 of the supporting arm with strain sensors 72 and 74 which are arranged on the transverse sides 62 and 66 [sic] and strain sensors 76 and 78 which are arranged on the long sides 66 and 68.

Figure 6:
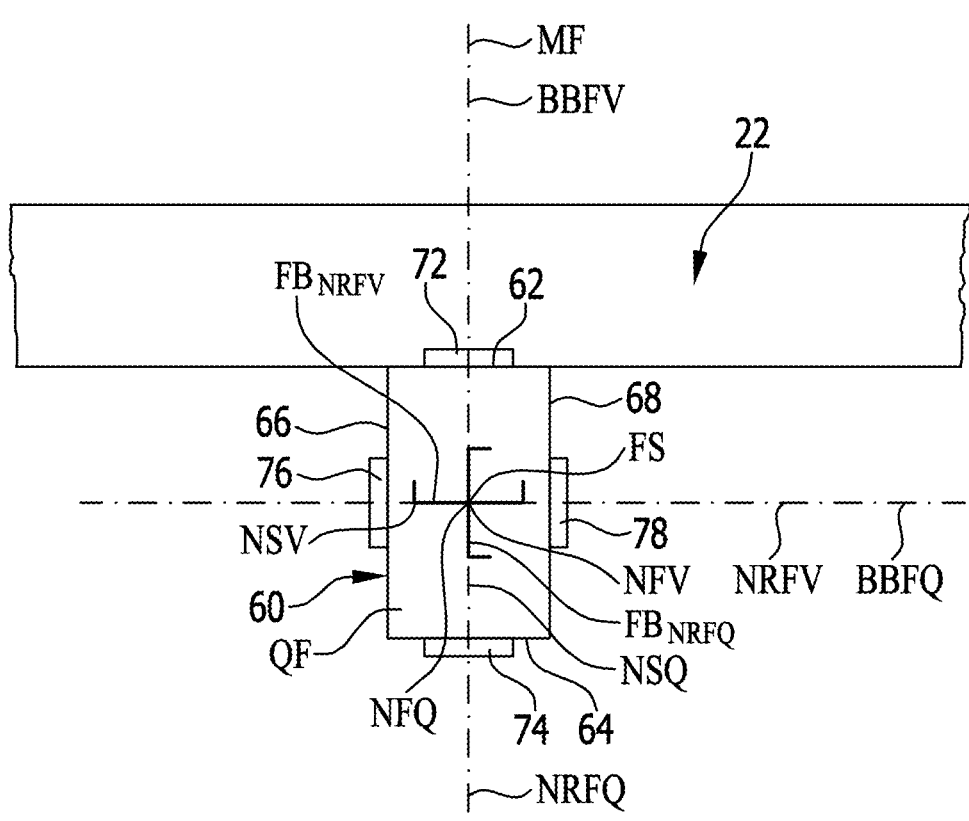
FIG. 6 a section along the line 6-6 in FIG. 5.

The strain sensors 72 and 74 are arranged on both sides of a surface region $FB_{NRFV}$ which represents a partial surface of the vertical neutral reference surface NRFV and exhibits in the different directions of extent ARX, ARY thereof lying in the vertical neutral reference surface NRFV a maximal extent of 1.5 times that exhibited by the strain sensors 72, 74 in these directions of extent (FIG. 6, 7).

Figure 5:
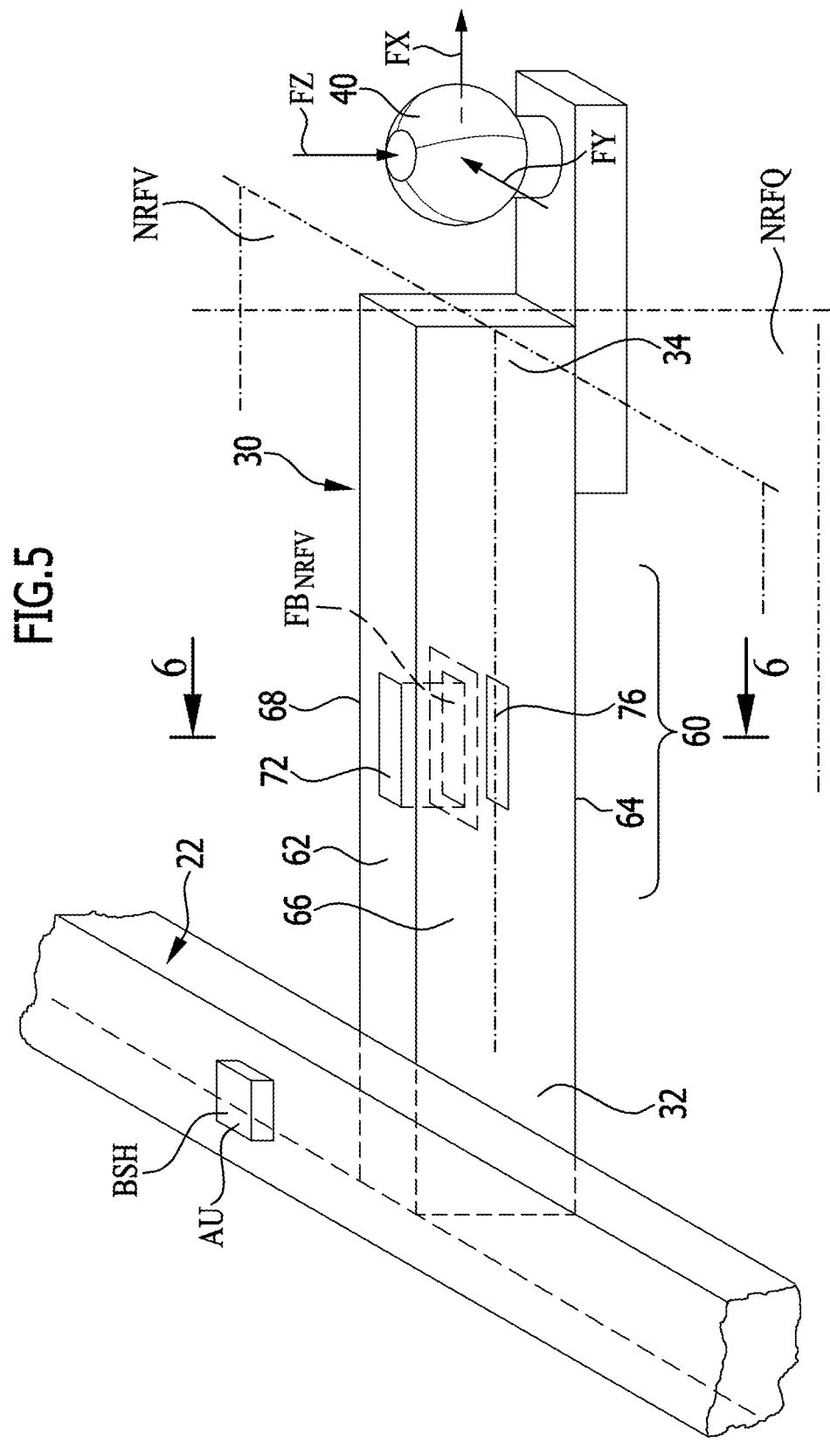
FIG. 5 an illustration of the first exemplary embodiment with strain sensors.
Figure 7:
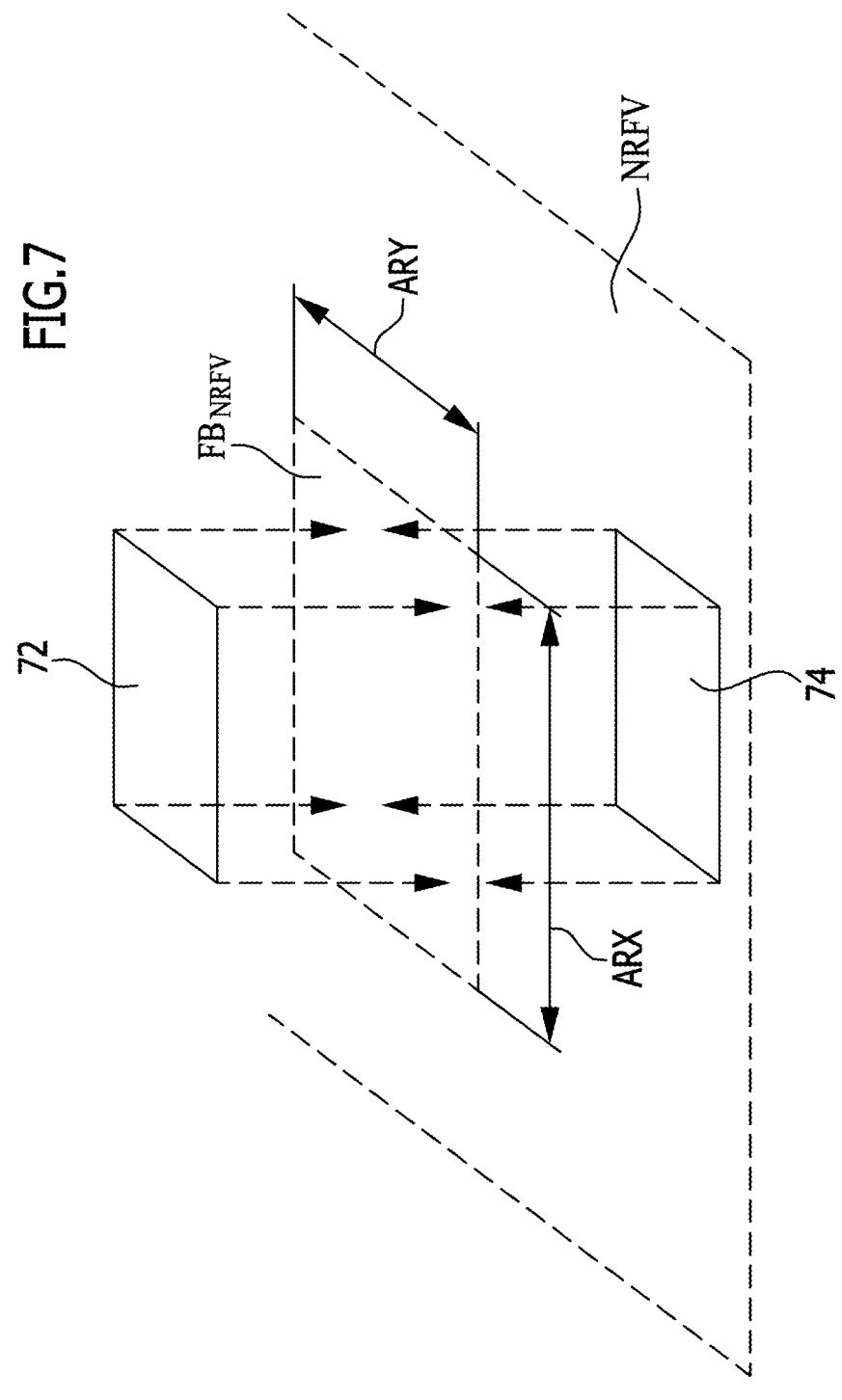
FIG. 7 an enlarged illustration of the arrangement of the strain sensors relative to a respective surface region of the respective neutral reference surface.

Furthermore, a vertical projection of the strain sensors 72, 74 onto the vertical neutral reference surface NRFV lies within the surface region $FB_{NRFV}$ as is illustrated in FIGS. 5 and 7 on the basis of the strain sensor 72.

Thus, the strain sensors 72 and 74 capture the material stresses MBS within the same volume region of the section 60 of the supporting arm that are produced by the vertical bending load and detect opposed material bending stresses in the presence of the vertical bending load which lead to signals of reverse prefix sign although in the same order of magnitude and preferably of approximately the same size in the case of the strain sensors 72, 74 that are arranged in the first exemplary embodiment at substantially the same distance from the vertical neutral reference surface NRFV.

Thus, for example, in the case of a static load produced by the force FZ, this can be determined by the strain sensors 72, 74, whereby, in the case of the device in accordance with the invention, the force FZ represents a hitching-load of a trailer or a load carrying unit which is acting on the element 40 of the supporting arm 30.

In a comparable way, the strain sensors 76 and 78 are also arranged on mutually opposite sides of the transverse neutral reference plane NRFQ and are arranged relative to a surface region $FB_{NRFQ}$ in such a way that the strain sensors 76 and 78 lie within the surface region $FB_{NRFQ}$ in the case of a vertical projection onto the transverse neutral reference surface NRFQ, whereby the surface region $FB_{NRFQ}$ exhibits in the directions of extent thereof lying in the surface region $FB_{NRFQ}$ a respective extent which maximally corresponds to 1.5 times the extent of the strain sensors 76, 78 parallel to these directions.

Moreover, a vertical projection of the strain sensors 76 and 78 also lies within the surface region $FB_{NRFQ}$.

Due to the arrangement of the strain sensors 76, 78 at approximately the same distance from the transverse neutral reference surface NRFQ, a transverse bending load BQ likewise results in signals of reversed prefix sign although they are in the same order of magnitude and are preferably of approximately the same size in the case of the strain sensors 76, 78.

The horizontal transverse force FY determined by the sensors 76, 78 represents, in particular in the case of the device in accordance with the invention, a lateral acceleration on the element 40 which arises for example whilst the motor vehicle is being driven in the event of rolling motions of the motor vehicle or of the motor vehicle with the trailer or with the load carrying unit.

Under the effect of the horizontal longitudinal force FX, the same elongations arise everywhere in the section 60 of the supporting arm so that in essence, all the strain sensors 72, 74, 76, 78 capture the same material bending stresses MZS.

In particular in the case of the device in accordance with the invention, a horizontal longitudinal force FX of this type represents a tensile force when the motor vehicle is being driven along which acts on the element 40. With knowledge of the acceleration, the mass of the trailer acting on the element 40 or of the load carrying unit acting on the element 40 can be determined from this tensile force.

In the solution in accordance with the invention, there is provided in particular an evaluating unit AU which collects the signals of the strain sensors 72, 74 and also possibly 76, 78 as well and from these it determines the hitching-load FZ on the element 40 in the stopped state of the motor vehicle, for example, by consulting a table which associates the signals of the strain sensors with a hitching-load, and thereafter, whilst being driven and by taking into consideration the measured hitching-load FZ, it determines the tensile force FX and if necessary the transverse force FY, likewise for example, by consulting a table which links the values for the hitching-load and the signals of the strain sensors when it is being driven with a value for the tensile force.

If, in addition, an acceleration sensor BSH for determining the acceleration in the horizontal longitudinal direction X is provided in the evaluating unit AU, then the evaluating unit AU is also able to determine the mass of a trailer engaging the element 40 or the mass of a load carrying unit held on the element 40. By virtue of the arrangement of the acceleration sensor BSH together with the evaluating unit, the value for the acceleration is readily available time-synchronously with the tensile force FX for determining the mass.

Figure 8:
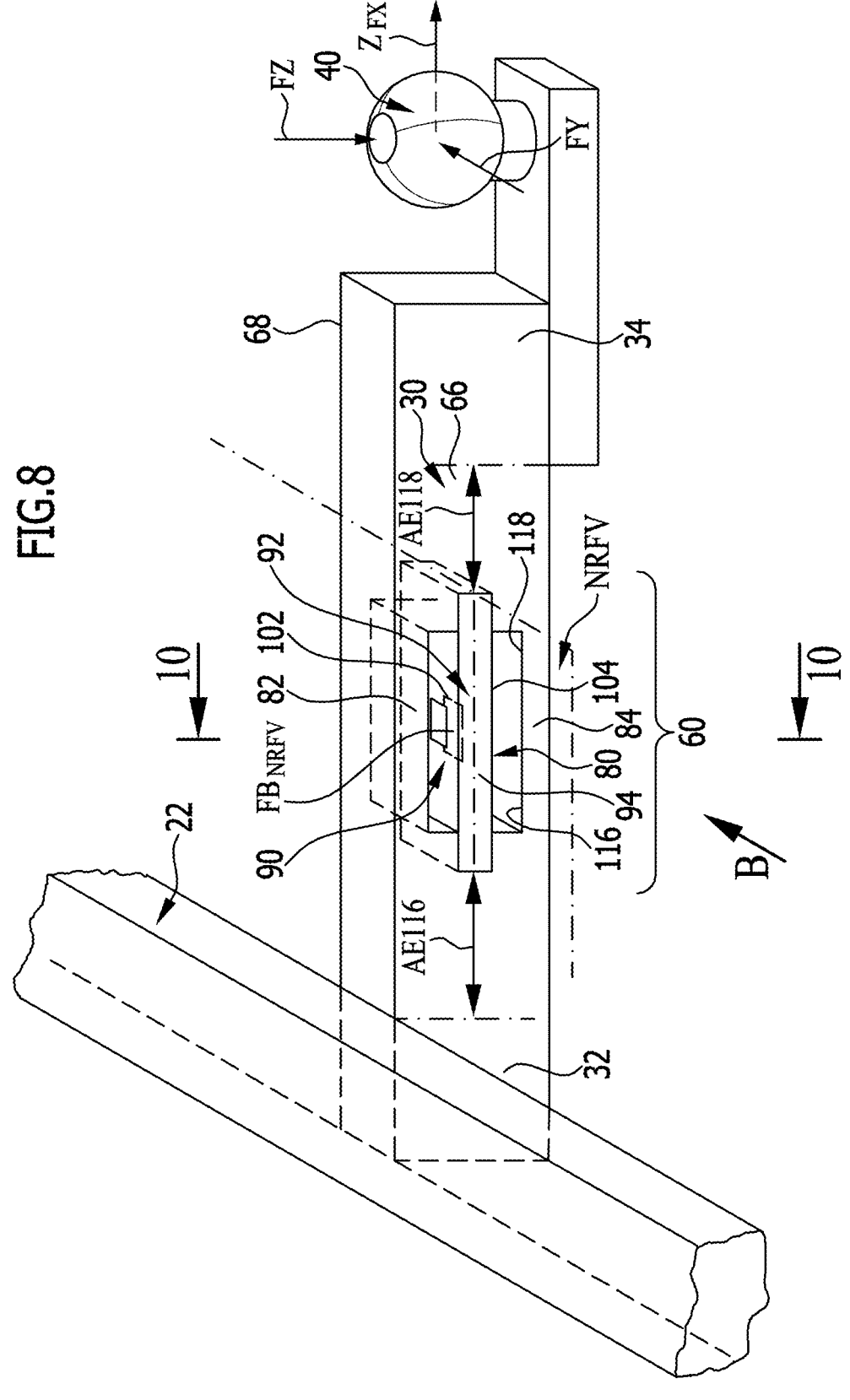
FIG. 8 an illustration similar to FIG. 2 of a second exemplary embodiment of the device in accordance with the invention.
Figure 9:
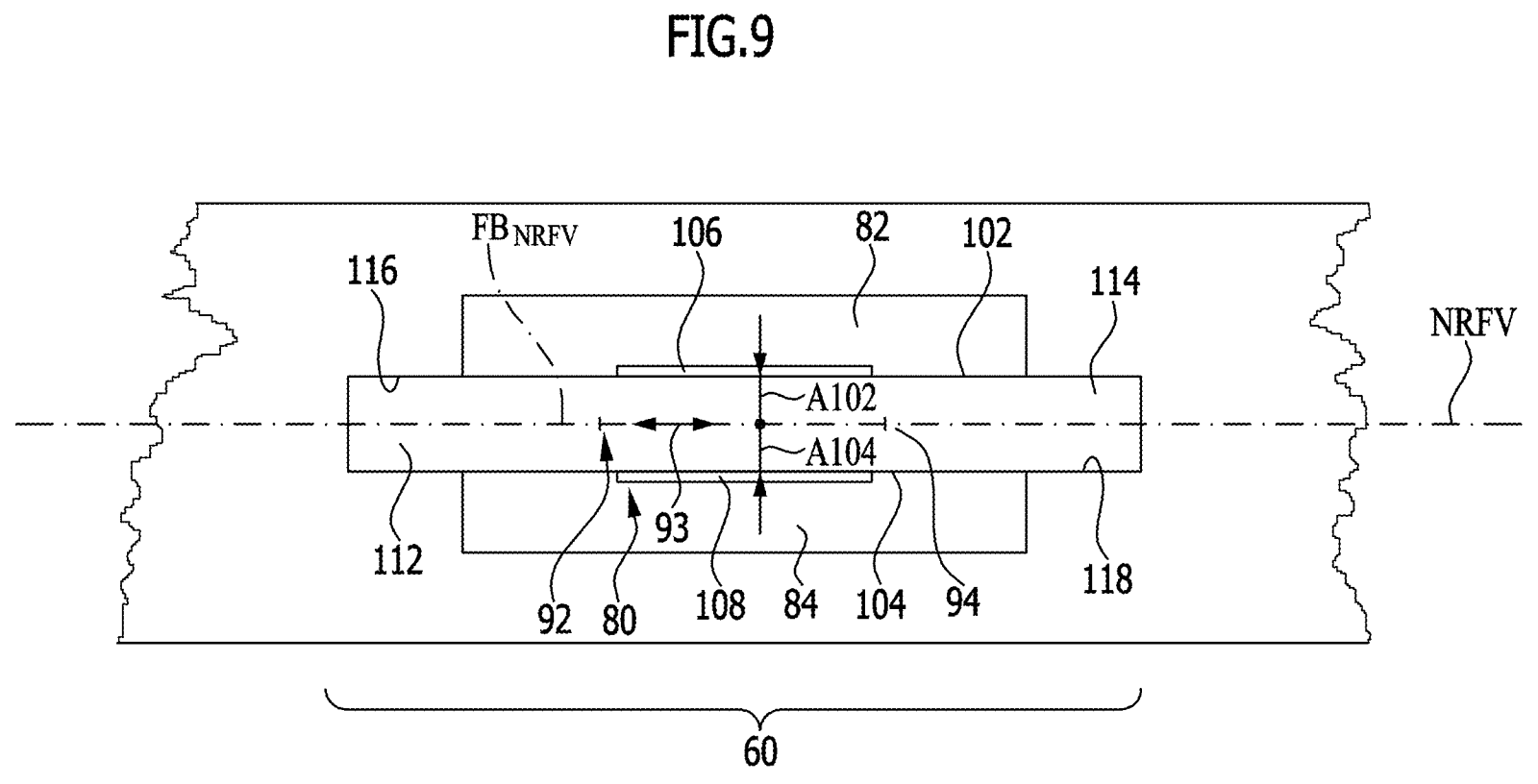
Figure 10:
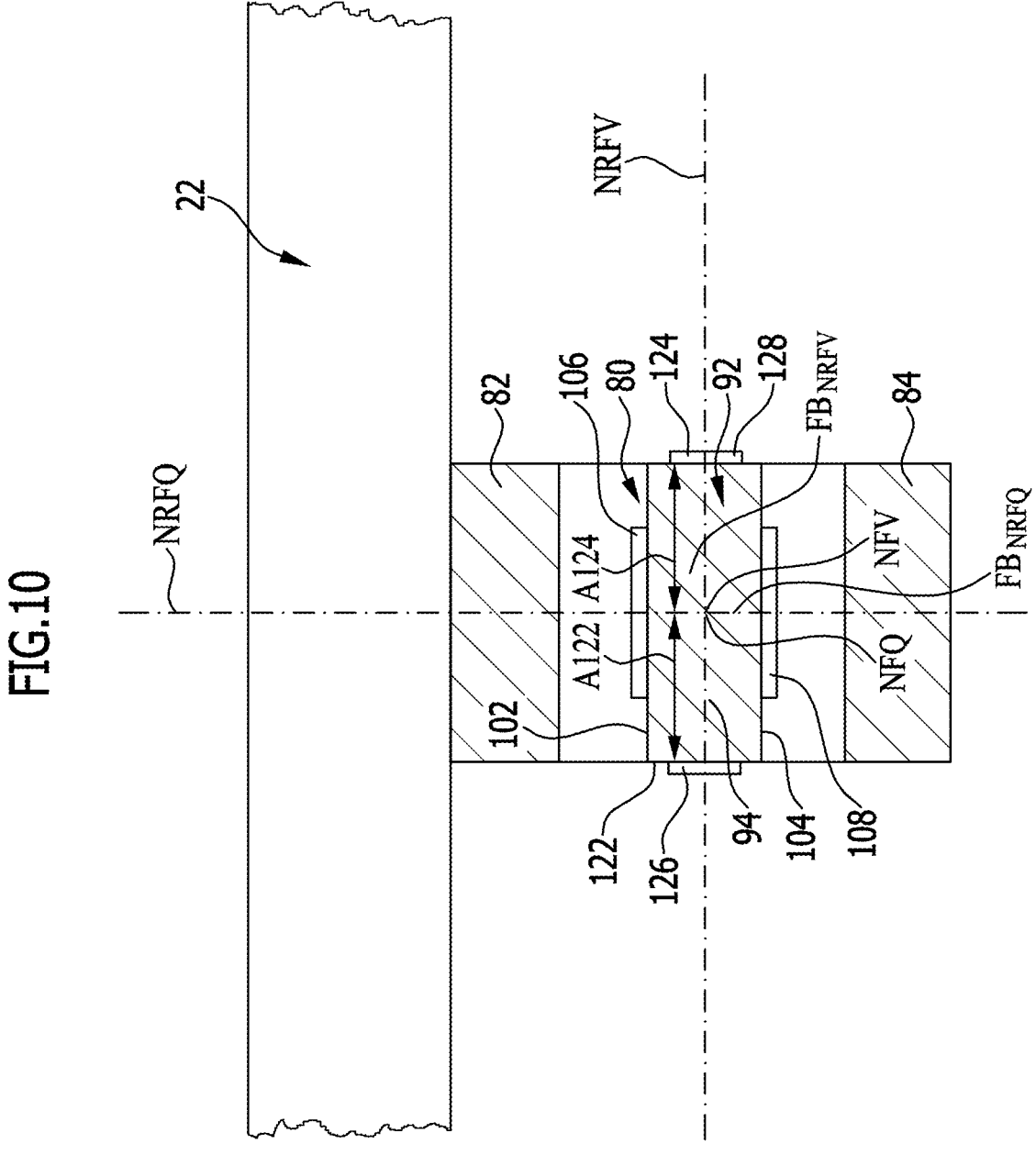
FIG. 10 a section along the line 10-10 in FIG. 8.

For capturing the reversible deformations of the section 60 of the supporting arm under the most diverse of loads by the vertical force FZ, the horizontal transverse force FY and the horizontal longitudinal force FX, the section 60 of the supporting arm is provided with a break-through 80 in the case of a second exemplary embodiment that is illustrated in FIGS. 8 to 10 which, for example, extends from the long side 66 to the long side 68 and approximately parallel to the vertical neutral reference surface NRFV and lies on both sides of the neutral reference plane NRFV, whereby the stability of the section 60 of the supporting arm on both sides of the break-through 80 is ensured by an upper flange 82 and a lower flange 84 of the section 60 of the supporting arm.

The break-through 80 only impairs the stability of the supporting arm 30 and thus too of the section 60 of the supporting arm in regard to a deflection under a bending load imposed by the vertical force FZ to an insignificant amount. This is because, in the event of such a load, as explained above, only very slight material stresses $MBS_Z$ occur close to the neutral reference plane NRFV which runs on the one hand through the neutral axis NFV and on the other hand transverse thereto and in particular perpendicularly relative to the bending loading surface BBFV, and these stresses do not make any substantial contribution to the stability of the supporting arm 30 against a vertical bending loading resulting from the application of the vertical force FZ.

A sensor unit, which is designated as a whole by 90, is arranged in this break-through 80 and comprises a sensor carrier 92 that extends in a longitudinal direction 93 and is arranged in such a way that the neutral reference plane NRFV cuts through the sensor carrier 92 in a central volume region 94.

Furthermore, the sensor carrier 92 comprises sensor carrier surfaces 102, 104 which are located on mutually opposite sides of the vertical neutral reference surface NRFV and are preferably at substantially the same distance from the vertical neutral reference surface NRFV and run substantially parallel to the vertical neutral reference surface NRFV. Strain sensors 106 and 108 which capture material elongations are arranged on these sensor carrier surfaces 102 and 104.

The sensor carrier 92 is connected fixedly to the section 60 of the supporting arm by a first end region 112 and a second end region 114 between which the sensor carrier surfaces 102 and 104 respectively lie but extends at least within the region of its sensor carrier surfaces 102 and 104 independently of the section 60 of the supporting arm so that the strain sensors 106 and 108 resting on the sensor carrier surfaces 102 and 104 capture exclusively the elongations occurring in the sensor carrier 92 on both sides of the vertical neutral reference surface NRFV.

The connection of the first end region 112 and the second end region 114 of the sensor carrier 92 to the section 60 of the supporting arm is effected in such a way that the sensor carrier 92 experiences qualitatively the same material stresses $MBS_Z$ as would a corresponding volume region of the section 60 of the supporting arm experience them.

For example, the connection between the first end region 112 and the second end region 114 of the sensor carrier 92 is effected through the recesses 116 and 118 which are provided in the section 60 of the supporting arm on both sides of the break-through 80 and which receive the end regions 112 and 114 in a form-fitting manner and thus at least qualitatively transmit the reversible deformations arising in the section 60 of the supporting arm to the sensor carrier 92.

In the solution in accordance with the invention, the strain sensors 106 and 108 are preferably arranged on mutually oppositely located sides of the vertical neutral reference surface NRFV, namely on both sides of a surface region $FB_{NRFV}$ which, in the respective directions of extent, exhibits maximally an extent of 1.5 times that of the strain sensors 106 and 108 so that the strain sensors 106, 108 are arranged in substantially mirror-like manner relative to the vertical neutral reference surface NRFV in order to capture the elongations or compressive distortions that arise.

Furthermore, the distances A102 and A104 of the sensor carrier surfaces 102 and 104 from the vertical neutral reference surface NRFV are preferably selected in such a way that one of the distances A102, A104 amounts to maximally 1.5 times that of the other one of the distances A104 or A102.

Thus, elongations of the sensor carrier 92 which arise on both sides of the same surface region $FB_{NRFV}$ of the vertical neutral reference surface NRFV and which—as described above—in the case of a deflection of the section 60 of the supporting arm, exhibit different prefix signs and lie in the same order of magnitude can be captured and, in the case of a purely tensile loading of the sensor carrier 92, simultaneously occurring elongations can be captured by both strain sensors 106, 108 as explained above.

Figure 2:
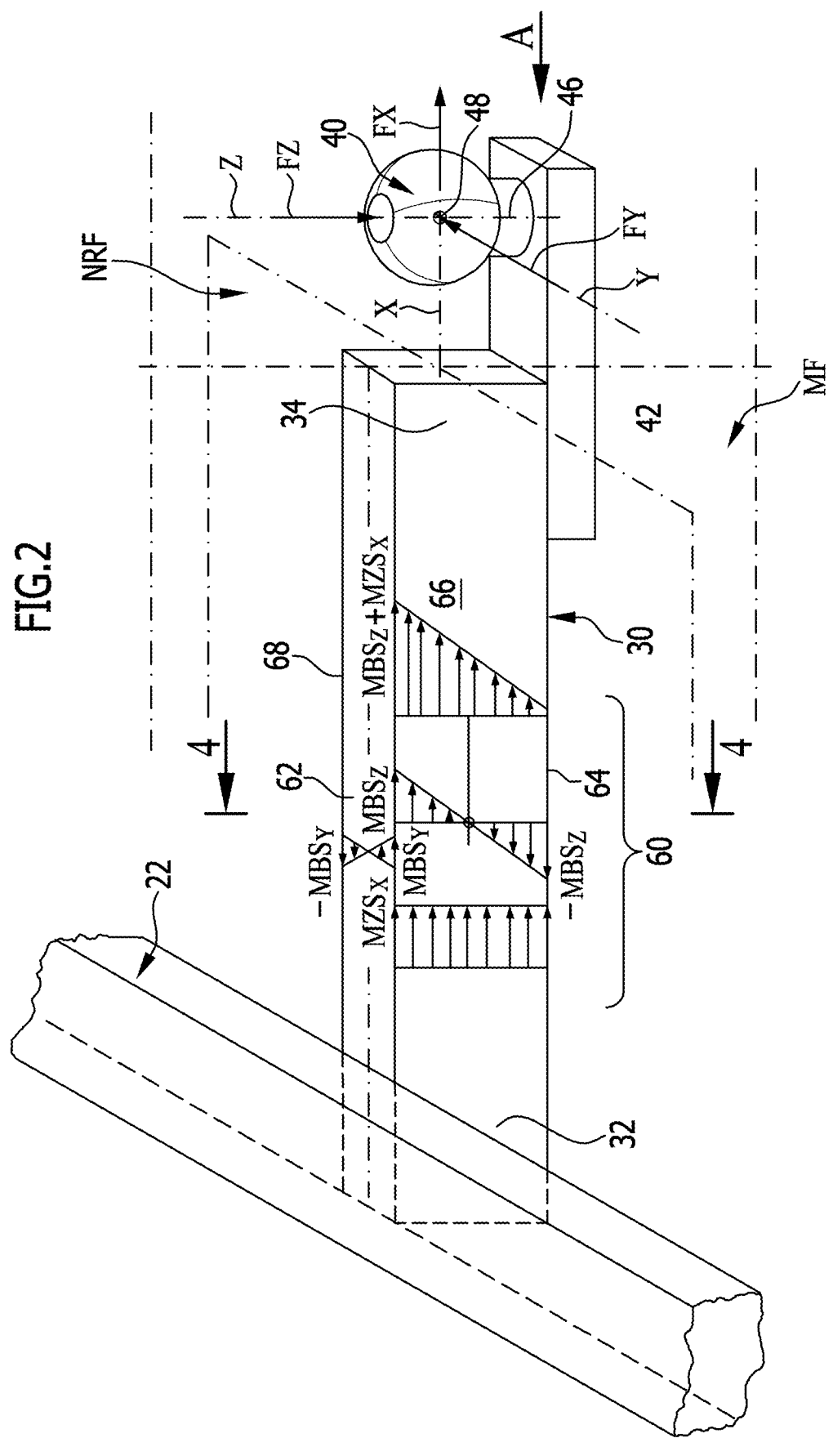
FIG. 2 a schematic illustration of the first exemplary embodiment of the device in accordance with the invention depicting bending and tensile loads.
Figure 3:
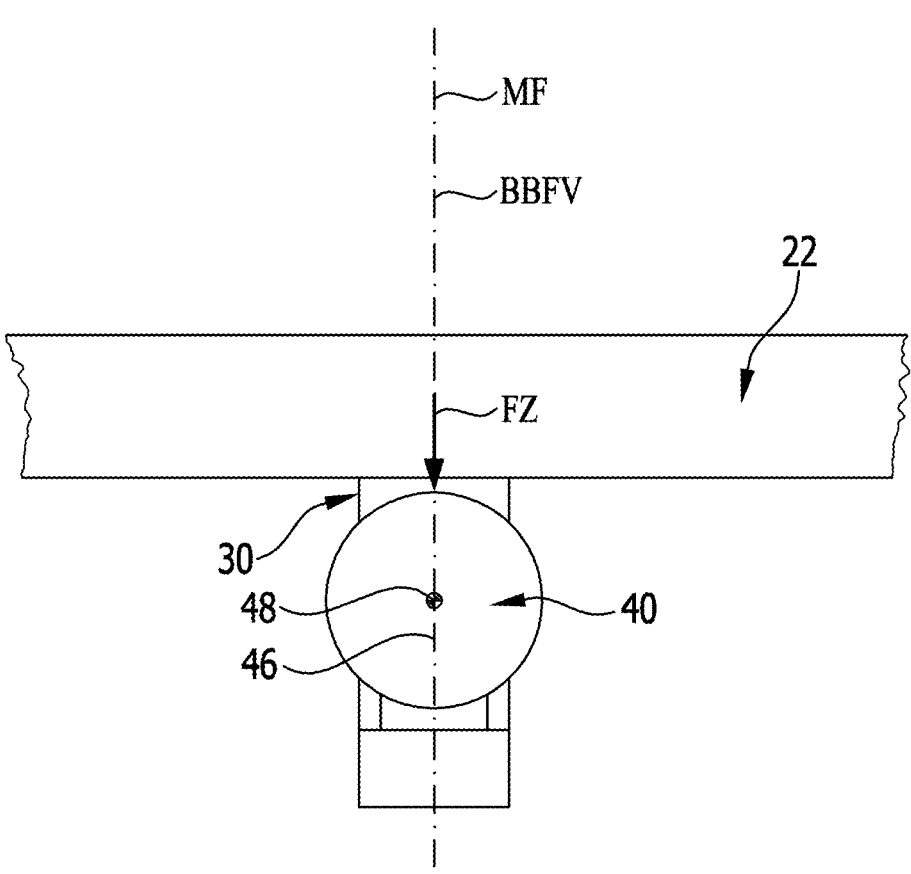
FIG. 3 a view of the first exemplary embodiment in the direction of the arrow A in FIG. 2.

If, additionally, the bending movements which the horizontal transverse force FY produces as was described in FIG. 2 should also need to be captured then the sensor carrier 92 is provided with sensor carrier surfaces 122, 124 which run transverse to the sensor carrier surfaces 102 and 104 and are arranged on mutually oppositely located sides of the transverse neutral reference surface NRFQ and upon which the strain sensors 126 and 128 are arranged.

The sensor carrier 92 is coupled to the section of the supporting arm 16 by the fixture of its end regions 112 and 114 in the recesses 116 and 118 in such a manner that even when the supporting arm 30 is subjected to loads by the horizontal transverse force FY, the sensor carrier 92 qualitatively displays the same bending movements as the section 60 of the supporting arm in the region of the upper flange 82 and the lower flange 84.

The strain sensors 126, 128 serve for capturing the elongations corresponding to the material stresses $MBS_Y$ and $-MBS_Y$.

The sensor carrier surfaces 122, 124 are also arranged at distances A122 and A124 from the transverse neutral reference surface NRFQ, whereby one of the distances A122, A124 is less than 1.5 times that of the distance A124 or A122.

Furthermore, the strain sensors 126 and 128 are located on opposite sides of a surface region $FB_{NRFQ}$, whereby the surface region $FB_{NRFQ}$ has an extent in the individual directions of extent which is maximally 1.5 times that of the corresponding extent of the respective strain sensor 126, 128 so that the strain sensors 126, 128 are arranged on both sides of the neutral reference surface NRFQ in substantially mirror like manner with respect thereto and thus capture the elongation of the material of the sensor carrier 92 at substantially the same place on opposite sides of the neutral reference surface NRFQ.

In a similar manner, the strain sensors 126 and 128 react in the same way to elongations due to the horizontal longitudinal force FX in such a manner that they capture the same elongation on both sides of the sensor carrier 92, as is also the case with the strain sensors 106 and 108.

In particular, the positioning of the seatings 116 and 118 relative to the first end region 32 of the supporting arm 30 and the second end region 34 of the supporting arm 30 is effected in such a manner that the spacings AE116 and AE118 thereof relative to each other are measured such that one of the distances AE116, AE118 amounts to less than 1.5 times the other one of the spacings AE118 or AE116, and in particular, the two spacings AE116 and AE118 are substantially equally large.

Thus, the sensor carrier 92 with the respective strain sensors 106 and 108 or 126 and 128 permits the effects of the vertical bending loading BV, the transverse bending loading BQ and the horizontal tensile load by the force in the longitudinal direction FX to be captured either separately or else by superimposition thereof.

In particular hereby, it is essential that, in the presence of the bending loads, the strain sensors 106, 108 or 126, 128 capture the material bending stresses of differing prefix signs, i.e. elongations on the one hand and compressive distortions on the other, on opposite sides of the corresponding vertical neutral reference surface NRFV and NRFQ, whilst the strain sensors 106 and 108 or 126 and 128 capture the same material stresses on both sides of the respective vertical neutral reference surface NRFV or the transverse neutral reference surfaces NRFQ when the horizontal longitudinal force FX is effective substantially in the respective cross-sectional areas QF of the section 60 of the supporting arm.

Thus, the vertical bending load and the horizontal bending load can each be produced separately or else superimposed on the horizontal tensile load measuring signals of the strain sensors 106 and 108 or 126 and 128, this then permitting a conclusion to be drawn in regard to the individual components of the vertical force FZ, the horizontal transverse force FY and the horizontal longitudinal force FX.

Furthermore, in the second exemplary embodiment, those elements which are identical with those of the preceding exemplary embodiments are provided with the same reference symbol so that reference can be made to the expositions in regard to the preceding exemplary embodiments.

In a third exemplary embodiment of a device in accordance with the invention which is illustrated in FIGS. 10 to 13, the carrier unit 20 is likewise provided in the tail region 14 of the motor vehicle body 12 of the motor vehicle 10 which, for example, likewise comprises the cross beam 22 that is connected by means of side members 26 to the tail region 14 of the motor vehicle body 12.

Furthermore, the cross beam 22 is arranged such that it is covered by the bumper unit 50.

Figure 11:
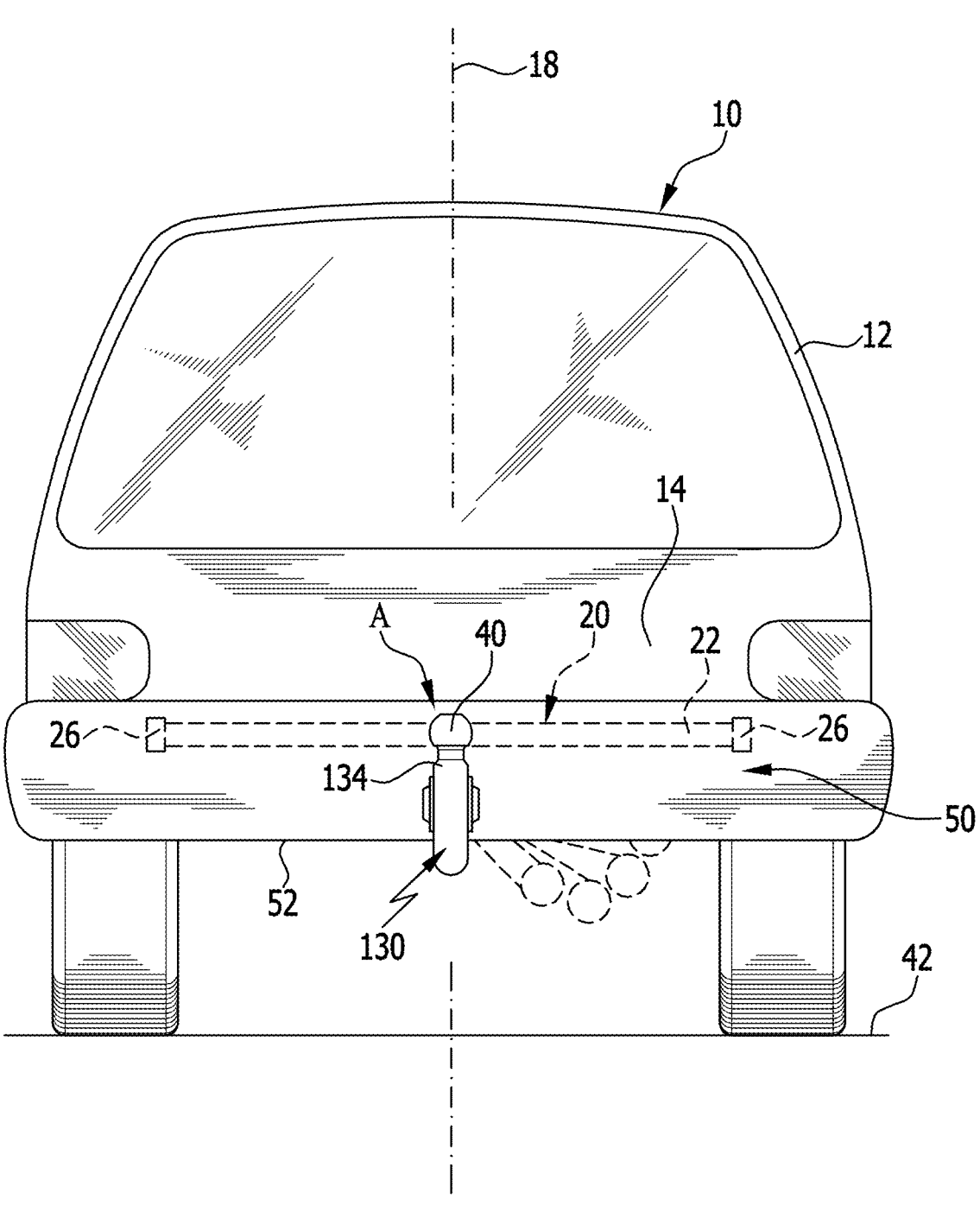
FIG. 11 a rear view of a vehicle with a third exemplary embodiment of a device in accordance with the invention.
Figure 12:
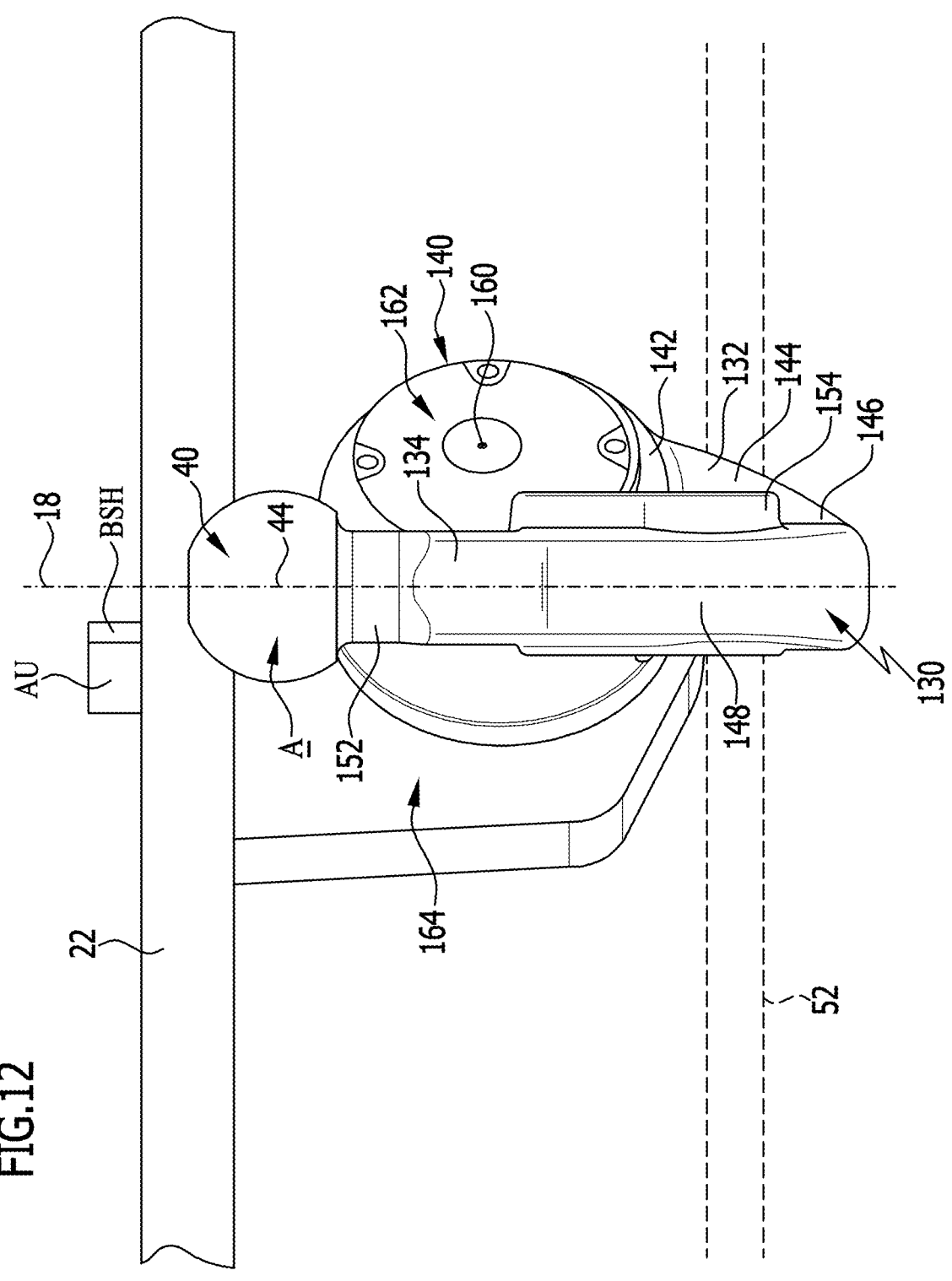
FIG. 12 an enlarged view of the device in accordance with the invention in a working position with removed bumper unit.

The supporting arm 130 likewise carries the element 40 which is in the form of a coupling ball, whereby, as is illustrated in particular in FIGS. 11 and 12, the supporting arm 30 extends from a swivel joint unit 140 to which the supporting arm 130 is connected at its first end region 132, whereby, for example, a swivel joint body 142 of the swivel joint unit 140 is formed at the first end region 132.

The supporting arm 130 in this exemplary embodiment then extends from the first end region 132 over a first curved piece 144 up to an intermediate piece 146 to which there is adjoined a second curved piece 148 that carries the element 40 in the form of a coupling ball, whereby yet another ball lug 152 is provided between the element 40 in the form of a coupling ball and the second curved piece 148.

The second curved piece 148 then forms the end region 134 of the supporting arm 130 which then for example, carries the ball lug 152 to which the element 40 in the form of a coupling ball is adjoined.

Figure 13:
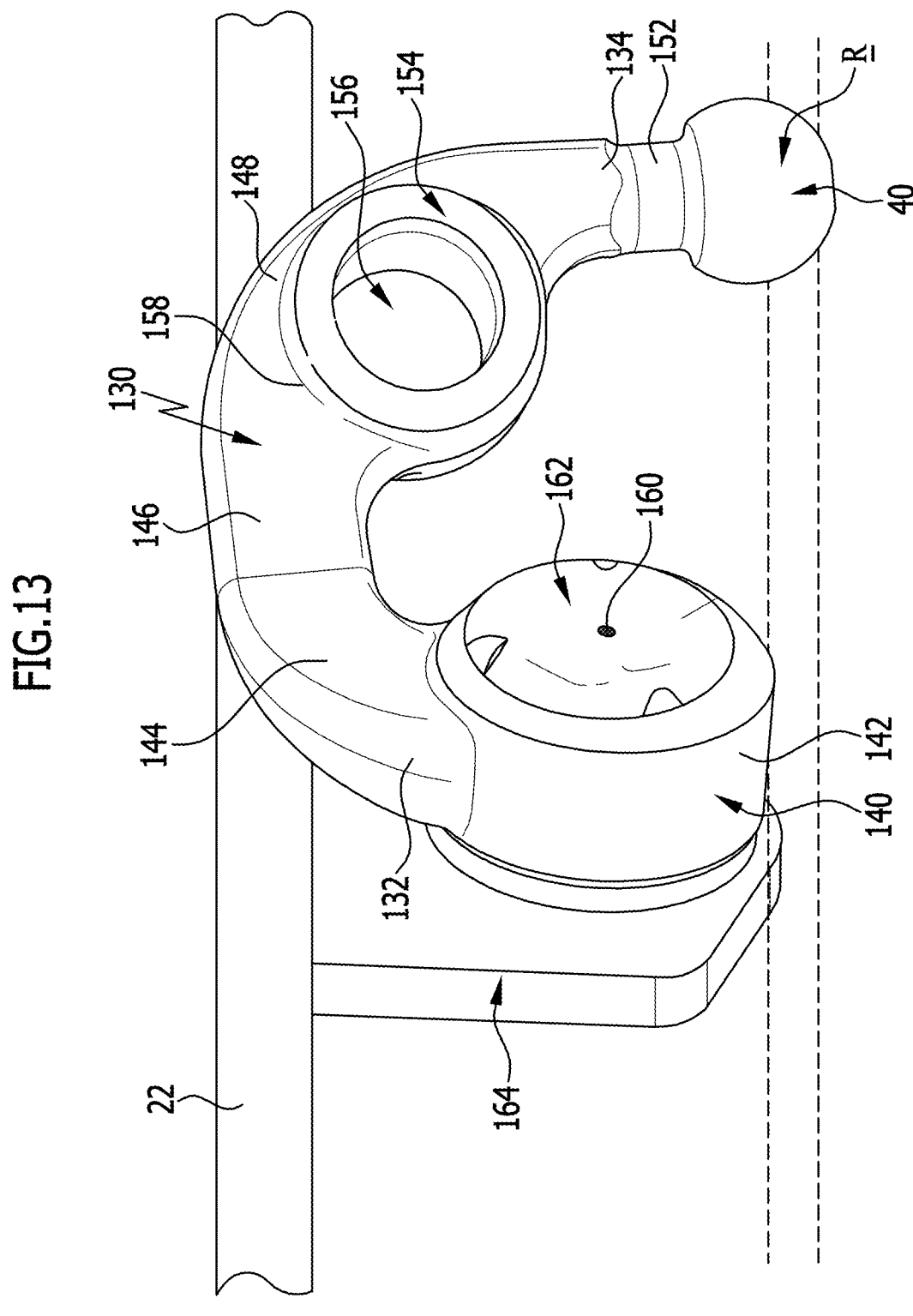
FIG. 13 an enlarged view similar to FIG. 12 of the device in accordance with the invention in a resting position with removed bumper unit.

For easy mounting of a contact unit as illustrated in FIGS. 12 and 13, an annular body 154 which surrounds a passage 156 in which a contact unit can be mounted is formed on the supporting arm 130 in the second curved piece 148.

Preferably, the annular body 154 is arranged in the second curved piece 148 in such a manner that, following the annular body 154, a transition into the intermediate piece 146 of the supporting arm 130 is effected by means of an adapter piece 158.

The swivel joint body 142 of the swivel joint unit 140 is mounted in a swivel joint seating 162 such that it is able to swivel about a swivelling axis 160 which, in particular, is inclined to a vertical vehicle longitudinal central plane 18, which said seating holds the swivel joint body 142 such that it is rotatable about the swivelling axis 160 on the one hand and, on the other hand, comprises a locking unit (not illustrated) which enables non-rotatable arrest of the supporting arm 130 with respect to swivelling movements about the swivelling axis 160.

For its part, the swivel joint body seating 162 is then in turn firmly connected to the cross beam 62 by means of a swivel joint base 164.

In this third exemplary embodiment as is illustrated in FIGS. 11, 12 and 13, the supporting arm 130 is pivotal from a working position A that is illustrated in FIGS. 11 and 12 in which the element in the form of a coupling ball 40 is positioned in such a way that it is located behind the bumper unit 50 on a side remote from a carriageway 42, into a resting position R that is illustrated in FIG. 13 in which the element 40 is arranged such that it faces the carriageway 42.

The element 40 is thereby movable under a lower edge 52 of the bumper unit 50.

In particular, in the working position A, the supporting arm 130 extends substantially in the vertical vehicle longitudinal central plane 18, whereby the latter intersects the element 40 centrally in the case where it is constructed in the form of a coupling ball so that a vertical ball central axis 44 lies in the longitudinal central plane 18.

In the case of the supporting arm 130 in accordance with the third exemplary embodiment, it is formed approximately U-shaped by virtue of the first curved piece 144, the intermediate piece 146 and the second curved piece 148 and, in the working position A in which the loads are imposed on the element 40 and these are to be captured, it is aligned in such a way that, for example, the forces FX and FZ which are acting on the element 40 and in particular, the central point of the ball 46 are transmitted via the approximately U-shaped supporting arm 130 to the swivel joint body 142 of the swivel joint unit 140, whereby the swivelling axis 160 represents a centre point of the force pick-up by the swivel joint unit 140.

Figure 14:
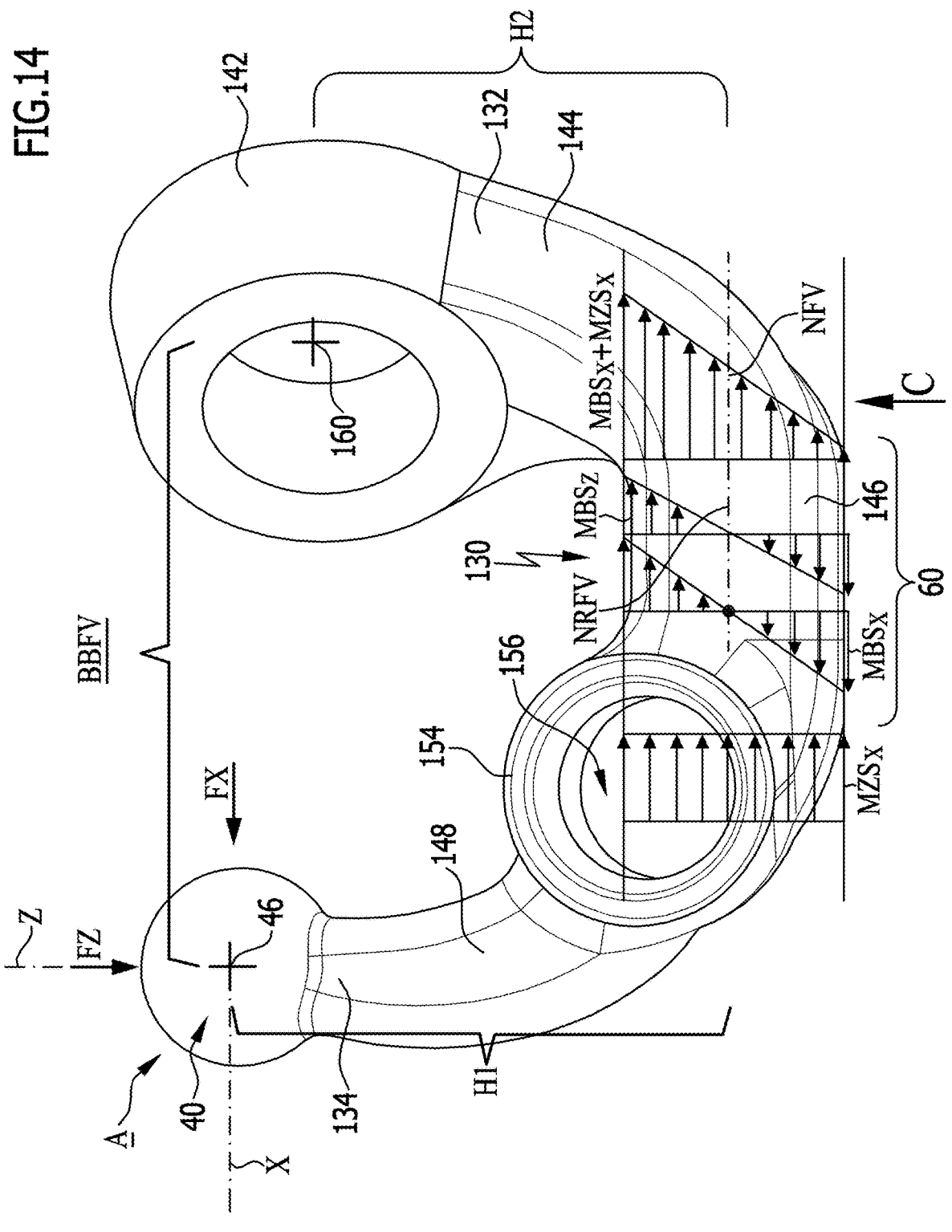
FIG. 14 an illustration of the supporting arm in accordance with the third exemplary embodiment depicting the effective forces and the material bending stresses and material tensile stresses resulting therefrom.

In this third exemplary embodiment, the intermediate piece preferably comprises the section 60 of the supporting arm in which the process of capturing the reversible deformations is to be effected. These, for example, are effective on the supporting arm 130 due to the forces FX and FZ (FIG. 14).

It is to be noted that the vertical force FZ acting on the element 40 in the direction of the force of gravity also leads to a pure bending thereof in the region of the intermediate piece 146 so that there is likewise a formation of a vertical neutral axis NFV and a vertical neutral reference surface NRFV in the section 60 of the supporting arm, whereby the neutral reference surface NRFV runs through the vertical neutral axis NFV and transverse to the vertical bending movement surface BBFV which itself extends parallel to the vertical force FZ in the direction of the force of gravity and defines the surface in which the supporting arm 130 moves when being subjected to the vertical force FZ in the direction of the force of gravity FZ and thereby yields as little as possible in a direction transverse thereto.

Hereby, as is illustrated in FIGS. 12 and 13 in the case of a supporting arm 130, the bending movement surface BBFV does not run exactly parallel nor coincide with the vehicle longitudinal central plane 18 but rather, it is inclined with respect thereto at least in sections thereof since the supporting arm 130 likewise does not run symmetrically relative to the vertical vehicle longitudinal central plane 18 as is illustrated in FIG. 12.

Figure 15:
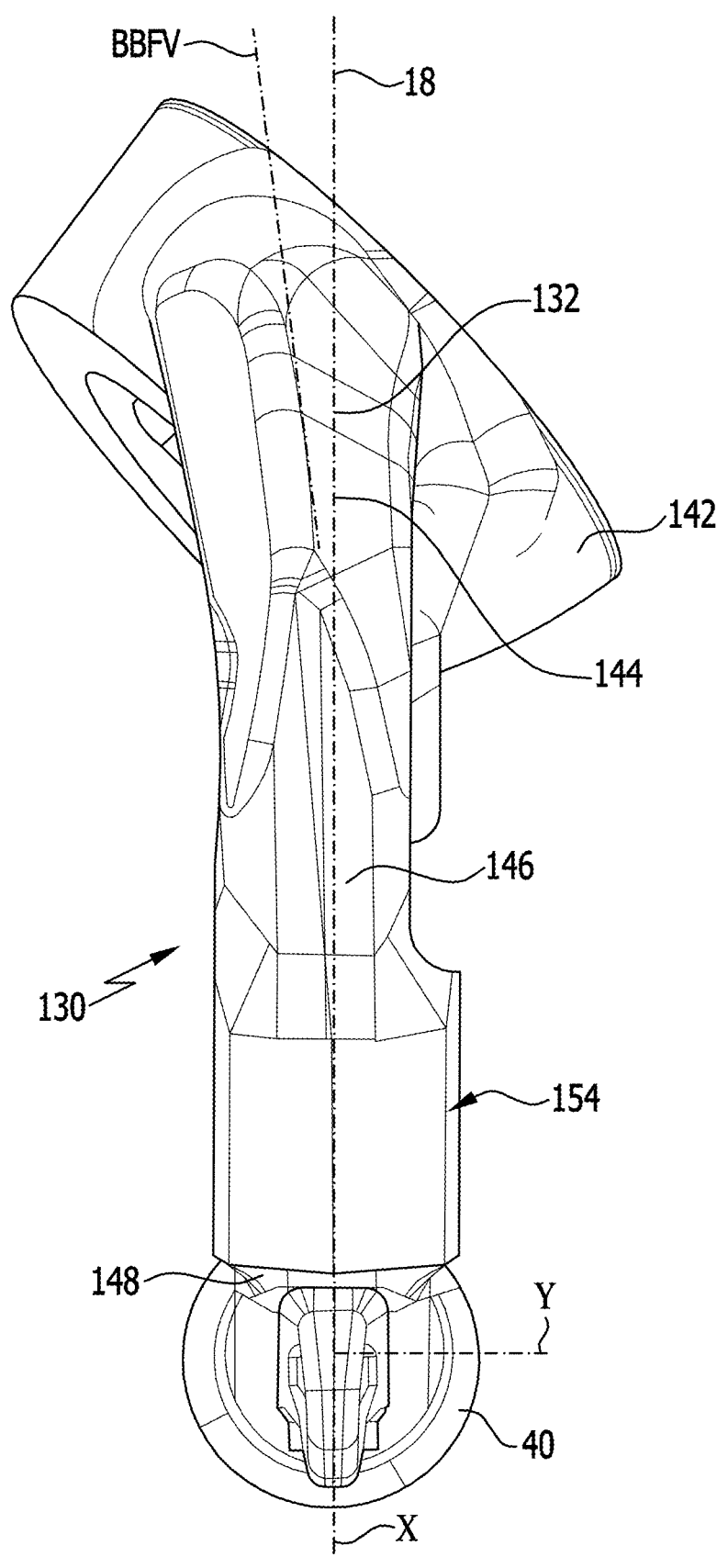
FIG. 15 a view of the supporting arm in accordance with FIG. 14 in accord with the arrow C in FIG. 14.

An exemplary depiction of the vertical bending movement surface BBFV when loaded by the vertical force FZ in the direction of the force of gravity FZ is illustrated in FIG. 15 for example.

Thus, the loading of the supporting arm 130 by the vertical force FZ in the direction of the force of gravity leads to a bending load in the section 60 of the supporting arm in the same way as was the case in the first and second exemplary embodiment.

The arrangement of the section 60 of the supporting arm for capturing the reversible deformations thereof is effected in the case of the supporting arm 130 in the intermediate piece 146 since this extends between the curved pieces 144 and 148 with a sizeable component thereof extending parallel to the horizontal longitudinal direction X in which the horizontal longitudinal force FX is acting so that elongations running parallel to the horizontal longitudinal direction X arise in the section 60 of the supporting arm.

In contrast to the first and second exemplary embodiment however, due to the different geometrical design of the supporting arm 130, a horizontal longitudinal force FX does not lead exclusively to purely material tensile stresses $MZS_X$ in the section 60 of the supporting arm but rather additionally, to a material bending stress $MBS_X$ since the horizontal longitudinal force FX acts on the section 60 of the supporting arm by means of a lever arm H1 and, moreover, the supporting section 60 in turn acts via the lever arm H2 on the swivel joint body 142 which ultimately fixes the supporting arm 130.

Thus, in contrast to the first and second exemplary embodiment and as is illustrated in FIG. 14, the horizontal longitudinal force FX results in the occurrence in the section 60 of the supporting arm in the region of the respective cross-sectional areas QF of both material tensile stresses $MZS_X$ which exhibit the same prefix sign over the entire cross section as well as material bending stresses $MBS_X$ which exhibit one prefix sign on the one side of the vertical neutral reference surface NRFV and a differing prefix sign on the opposite side.

This has the consequence that in the case of the horizontal longitudinal force FX the material tensile stresses $MZS_X$ and the material bending stresses $MBS_X$ are added to each other and are thus superimposed in the section 60 of the supporting arm.

Figure 16:
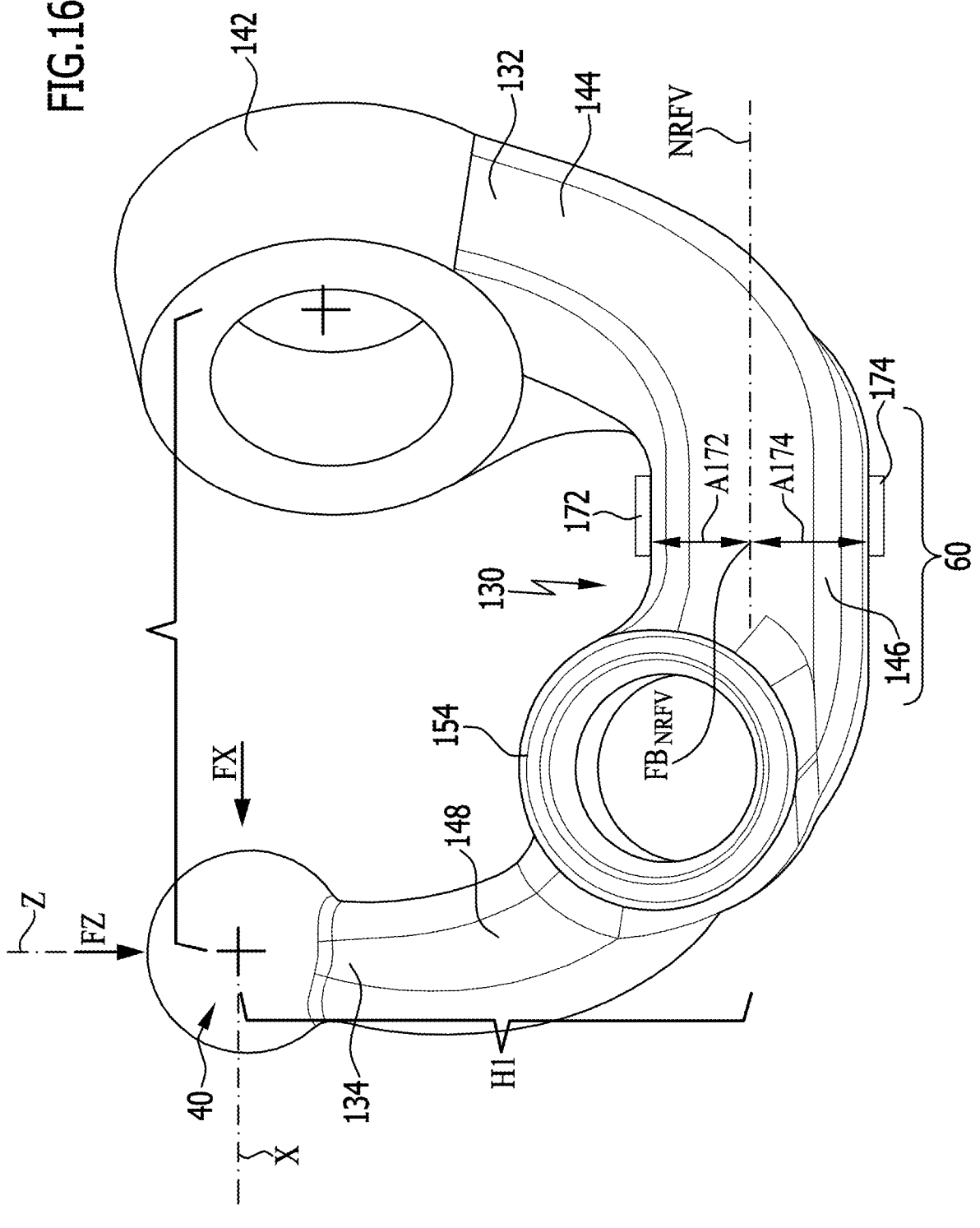
FIG. 16 an illustration of the supporting arm in accord with FIG. 14 depicting the provided strain sensors.

For capturing the different material bending stresses $MBS_Z$ and $MBS_X$ as well as the material tensile stresses $MZS_X$ and as is illustrated in FIG. 16 for example, strain sensors 172 and 174 are provided on both sides of the bounded surface region $FB_{NRFV}$ of the vertical neutral reference surface NRFV, whereby said sensors rest directly upon the outer surfaces of the intermediate piece 146 for example and thus capture the elongations arising on both sides of the vertical neutral reference surface NRFV.

Preferably thereby, the strain sensors 172 and 174 are arranged at distances A172 and A174 from the neutral reference surface NRFZ which are approximately equally large, and are preferably of a size such that the one of the distances A172, A174 amounts to less than 1.5 times that of the distances A174 or A172.

That is to say, that under the effect of the vertical force FZ, one of the strain sensors 172, 174 measures an elongation and the other one of the strain sensors 174 or 172 measures a compressive distortion, depending upon whether the vertical force FZ is acting in the direction of the force of gravity or in a direction opposite to the direction of the force of gravity.

If, on the other hand, the horizontal longitudinal force FX is acting on the element 40 then, for example, one of the strain sensors 172, 174 measures a smaller elongation than the other one of the strain sensors 172, 174 since the sum of the material tensile stresses $MZS_X$ and the material bending stresses $MBS_X$ have an effect upon the elongations that are to be measured.

Thus, in the third exemplary embodiment, the possibility likewise exists of determining the force FZ and thus the hitching-load from the signals of the strain sensors 172, 174 with the aid of the evaluating unit AU in the static condition, i.e. when it is not being driven, and of determining the mass of the trailer or the load carrying unit when it is being driven given a knowledge of the hitching-load FZ, the tensile force FX and by taking into consideration the acceleration in the horizontal longitudinal direction X that was determined by the acceleration sensor BSH.

Furthermore, in the case of the third exemplary embodiment, those elements which are identical to those of the preceding exemplary embodiments are provided with the same reference symbols so that reference can be made to the disclosure in regard to the preceding exemplary embodiments.

Figure 17:
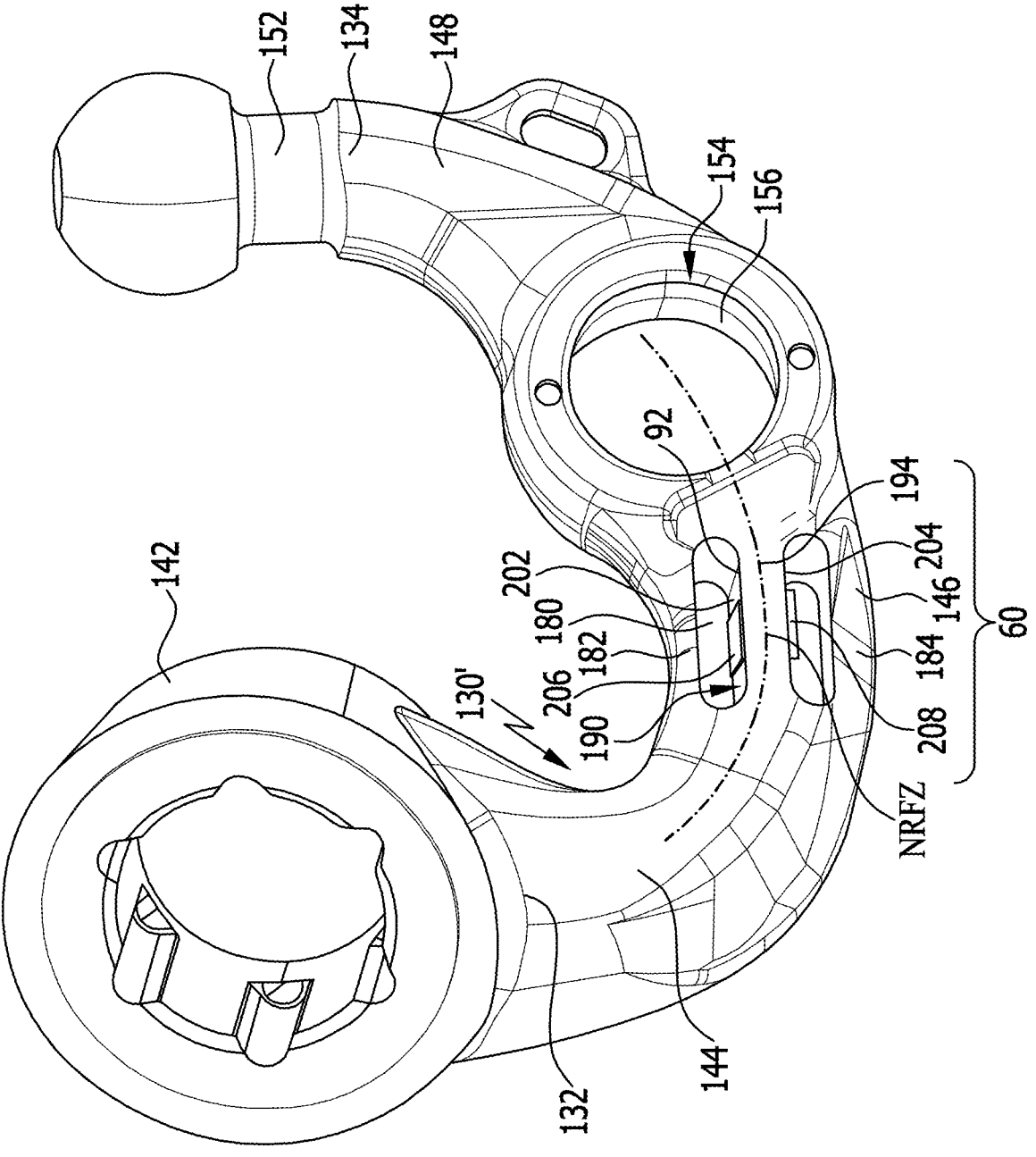
FIG. 17 an illustration of a supporting arm in accordance with a fourth exemplary embodiment of the device in accordance with the invention.
Figure 18:
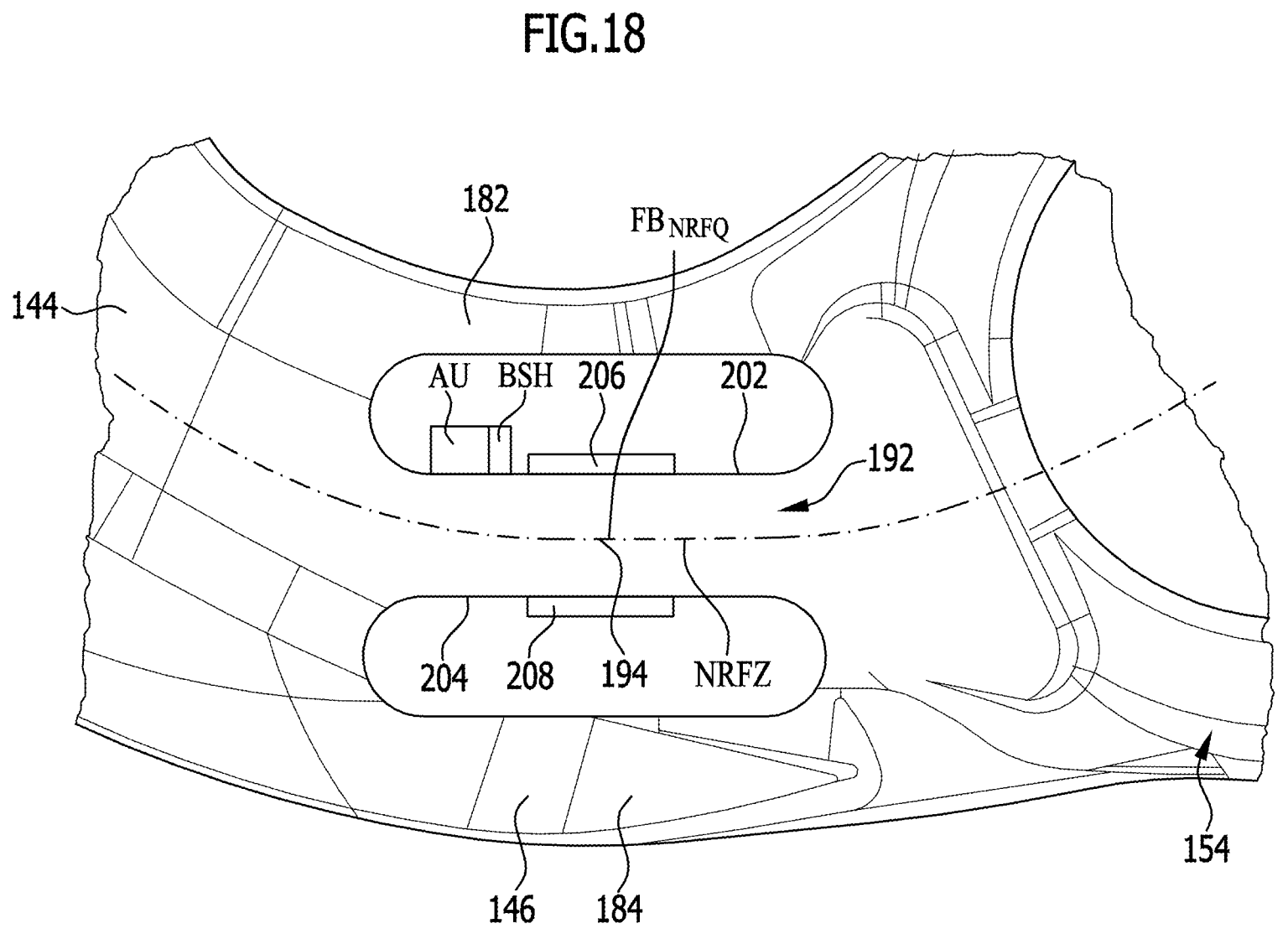

In a fourth exemplary embodiment of the solution in accordance with the invention which is illustrated in FIGS. 17 and 18, there is provided in the intermediate piece 146 forming the section 60 of the supporting arm and in a similar way to the second exemplary embodiment a break-through 180 which passes through the section 60 of the supporting arm and extends in parallel with the vertical neutral reference surface NRFV and is bounded by an upper flange 182 and a lower flange 184 and in which there is arranged a sensor unit 190 which comprises a sensor carrier 192 that is intersected in a central volume region 194 thereof by the vertical neutral reference surface NRFV in the same way as in the second exemplary embodiment.

Hereby, the sensor carrier 192 carries strain sensors 206 and 208 which are arranged on sensor carrier surfaces 202 and 204 and which, in the same way as was the case in the second exemplary embodiment, are able to capture the material tensile stresses $MBS_Z$, $MBS_X$ and $MZS_X$ arising in the sensor carrier 192 by means of the elongations or compressive distortions occurring in the sensor carrier 192 in the region of the sensor carrier surfaces 102 and 104.

In this case, the sensor carrier 192 is likewise coupled directly to the section 60 of the supporting arm in that the sensor carrier 192 is a part that is connected to the remaining section 60 of the supporting arm in one-piece manner so that all of the reversible deformations in the supporting arm region 60 are transmitted qualitatively to the sensor carrier 192 and thus the same elongations and compressive distortions can be captured qualitatively in the sensor carrier 192 by the strain sensors 202 and 204.

Thus for example, in the event of a static load imposed by the force FZ, this can be determined by the strain sensors 206, 208 whereby, in the case of the device in accordance with the invention, the force FZ represents a hitching-load of a trailer or a load carrying unit that is acting on the element 40 of the supporting arm 130'.

Due to the effect of the horizontal longitudinal force FX, the self-same elongations arise everywhere in the section 60 of the supporting arm so that the strain sensors 206, 208 all capture substantially the self-same material bending stresses MZS.

In particular in the case of the device in accordance with the invention, a horizontal longitudinal force FX of this type represents a tensile force which is acting on the element 40 when the motor vehicle is being driven along, whereby the mass of the trailer effective on the element 40 or of the load carrying unit acting on the element 40 can be determined from this tensile force together with a knowledge of the acceleration.

In the fourth exemplary embodiment of the solution in accordance with the invention in particular, an evaluating unit AU is provided on the sensor carrier 192 which captures the signals of the strain sensors 206, 208 and determines therefrom the hitching-load FZ on the element 40 when the motor vehicle is stopped by consulting a table which associates the signals of the strain sensors 206, 208 with a hitching-load for example, and thereafter determines the tensile force FX when it is being driven along by taking into consideration the measured hitching-load FZ, for example, by consulting a table which links the values for the hitching-load and the signals of the strain sensors when it is being driven with a value for the tensile force.

Furthermore, an acceleration sensor BSH is additionally provided in the evaluating unit AU for capturing the acceleration in the horizontal longitudinal direction X so that the evaluating unit AU is also able to determine the mass of a trailer engaging the element 40 or a load carrying unit held on the element 40.

In the fourth exemplary embodiment, those elements that are identical to those of the preceding exemplary embodiments are provided with the same reference symbols so that reference can be made to the disclosure in regard to the preceding exemplary embodiments.

Figure 19:
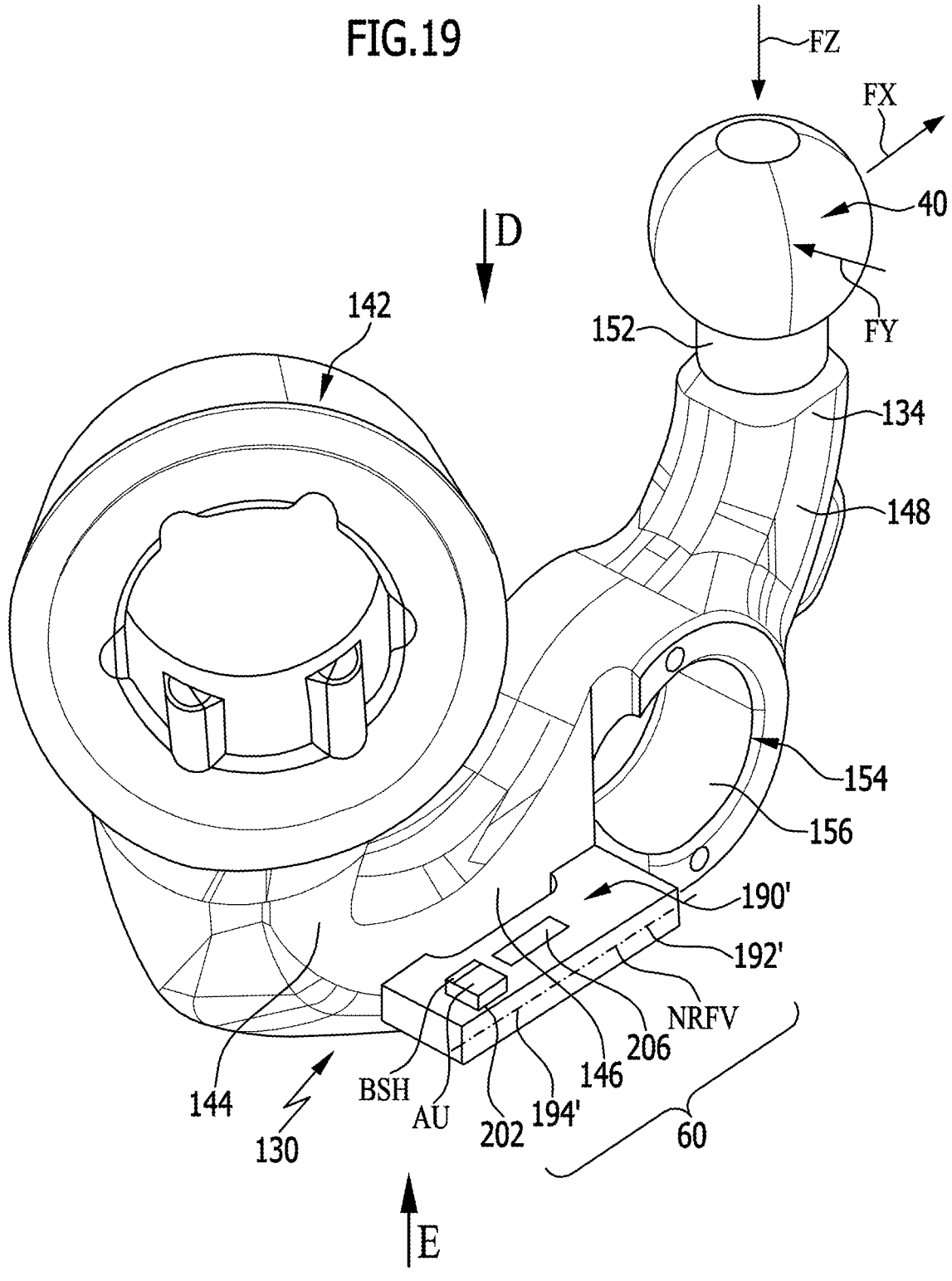
FIG. 19 a perspective illustration of a supporting arm in accordance with a fifth exemplary embodiment.
Figure 20:
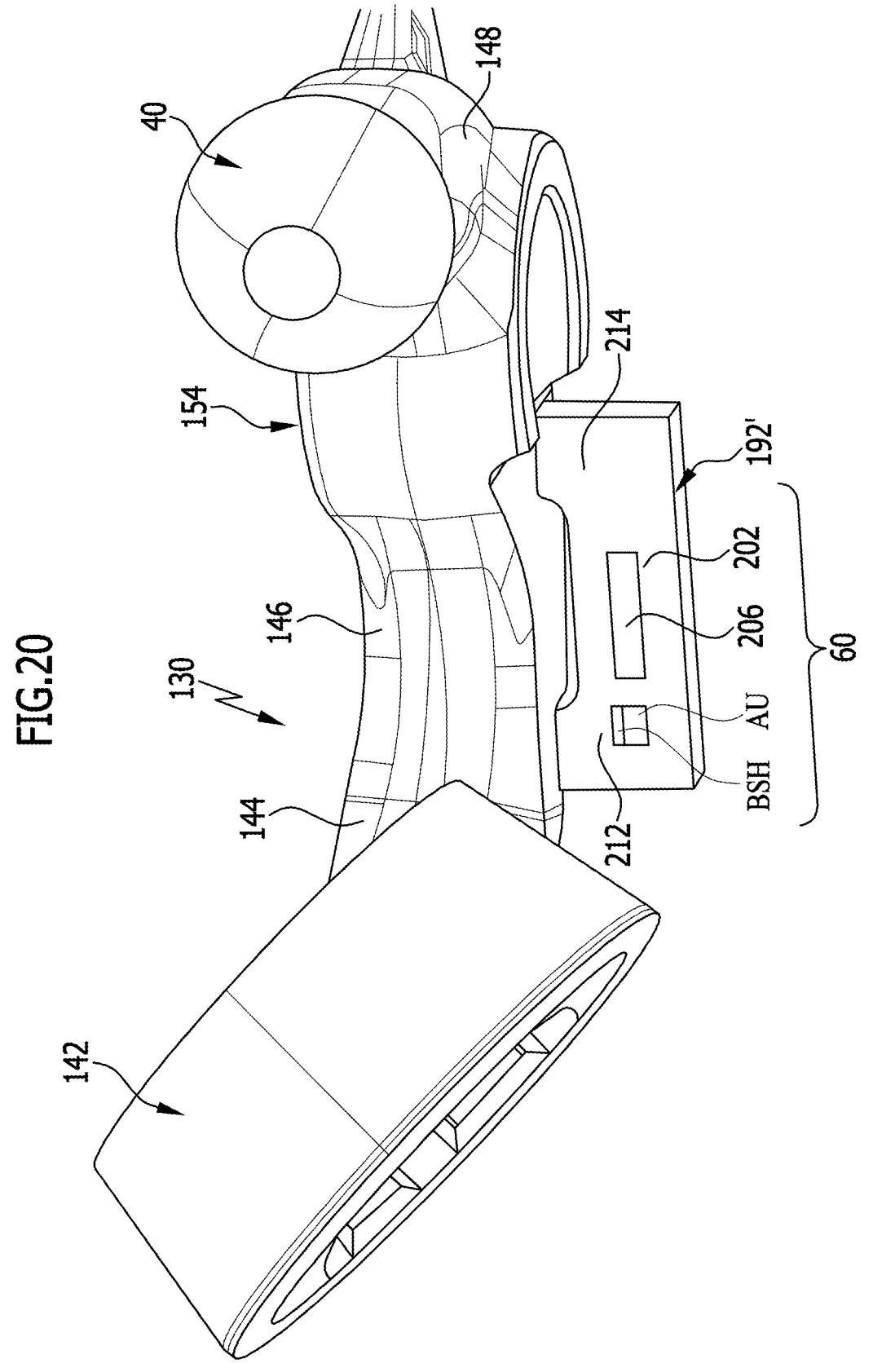
FIG. 20 an illustration of the supporting arm in accordance with FIG. 19 in the direction of the arrow D in FIG. 19.
Figure 21:
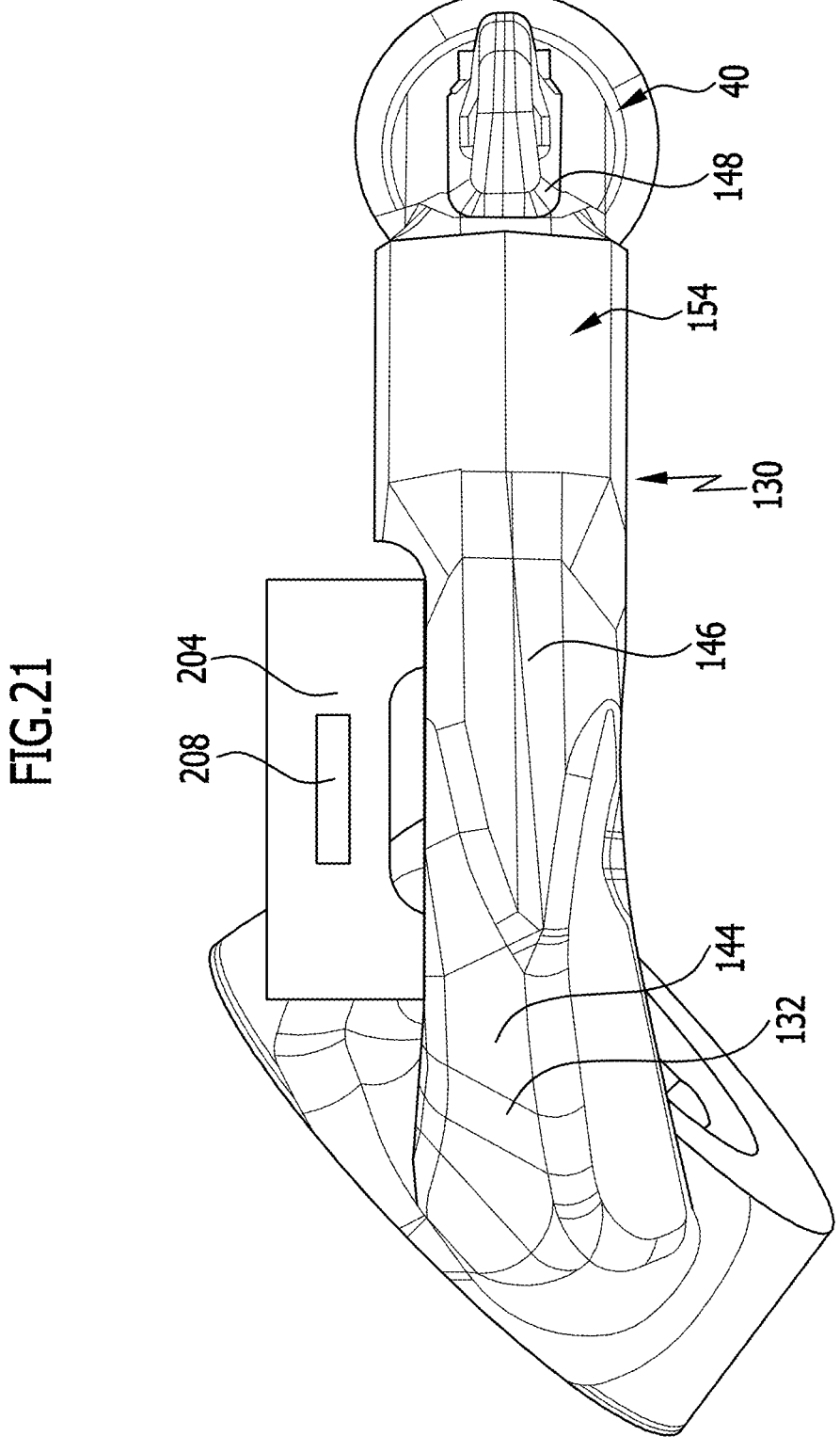
FIG. 21 an illustration of the supporting arm in accordance with FIG. 19 in the direction of the arrow E in FIG. 19.
Figure 22:
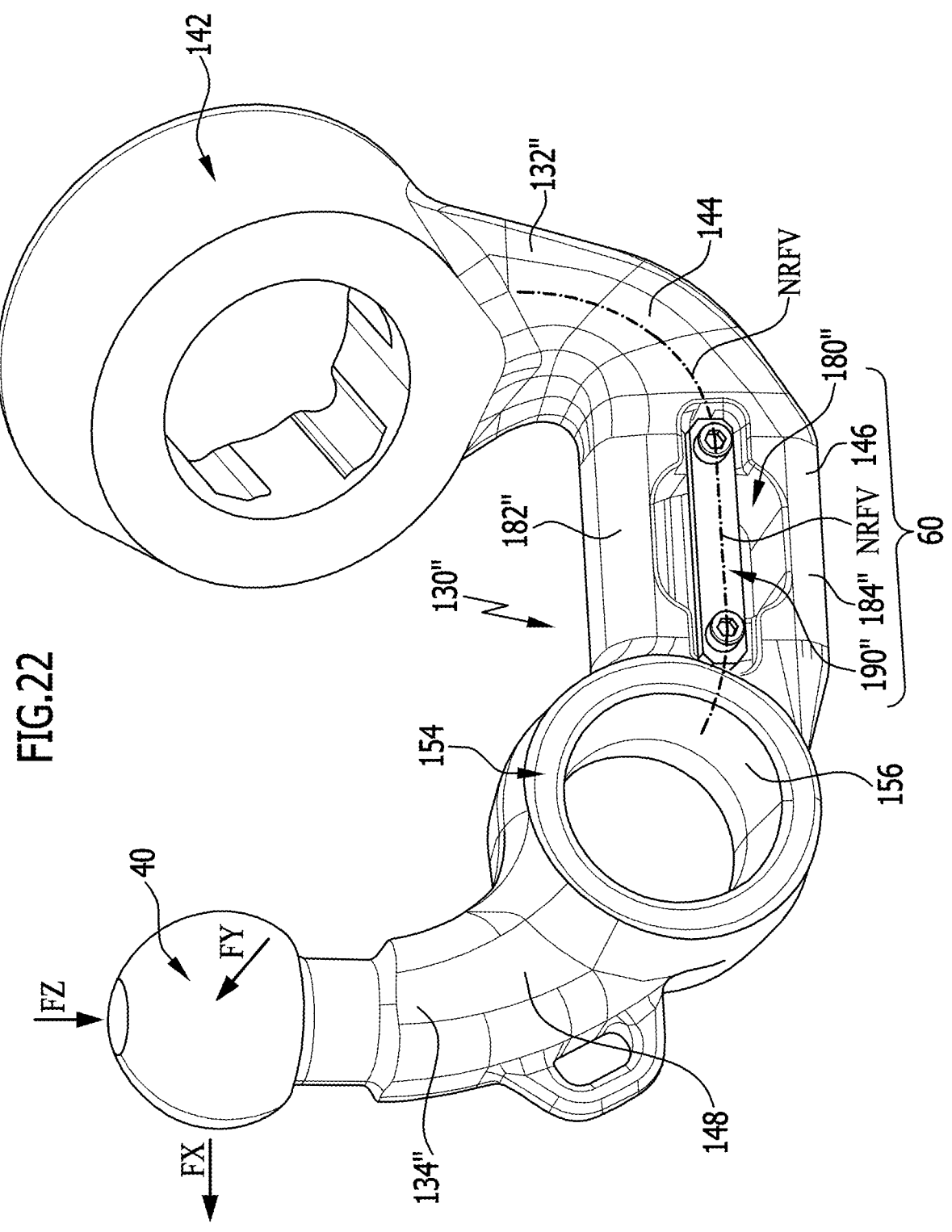
FIG. 22 an illustration of the supporting arm in accordance with a sixth exemplary embodiment of the device in accordance with the invention.
Figure 23:
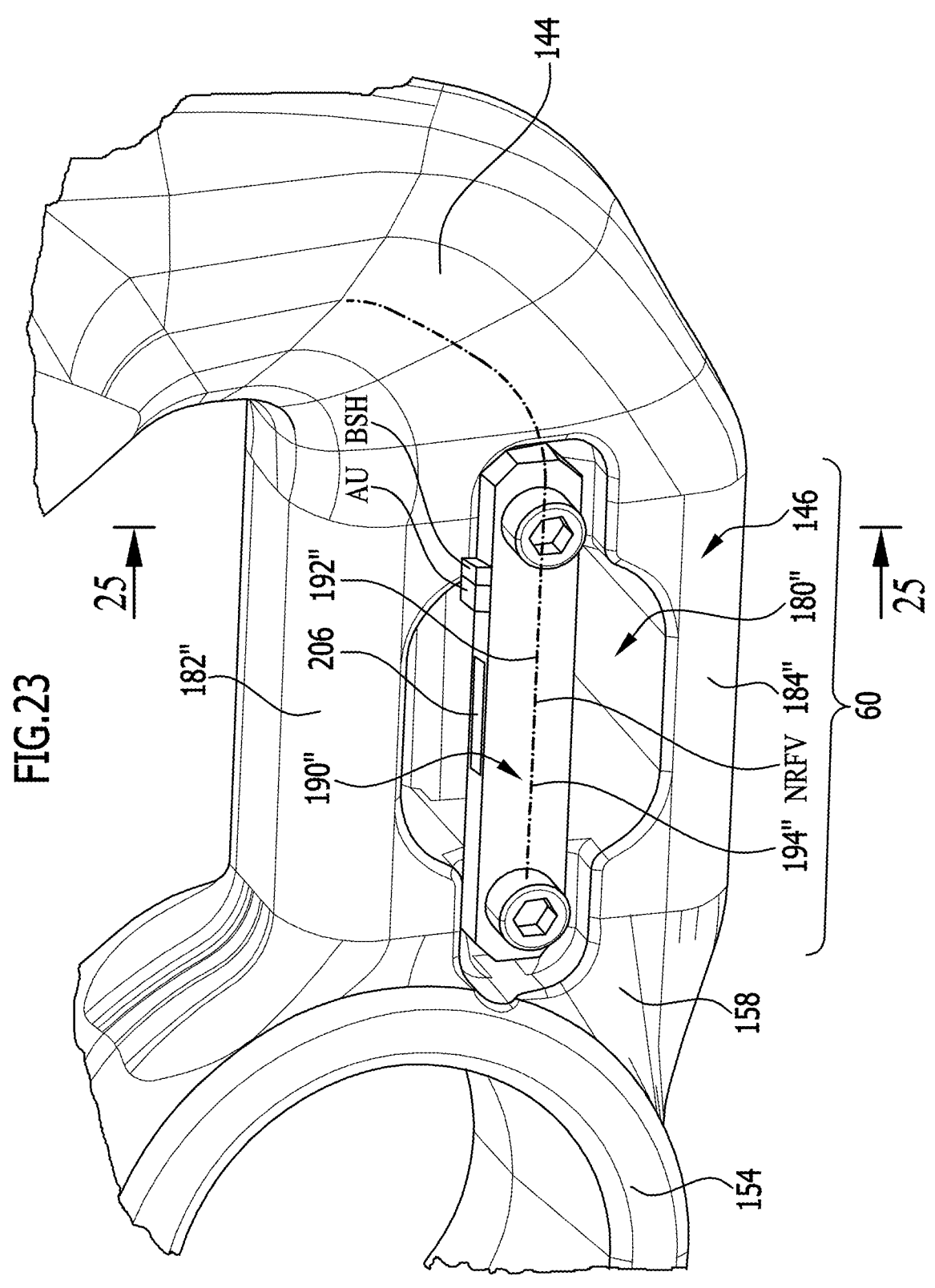
FIG. 23 an enlarged illustration of the supporting arm section of the supporting arm in accordance with FIG. 22.
Figure 24:
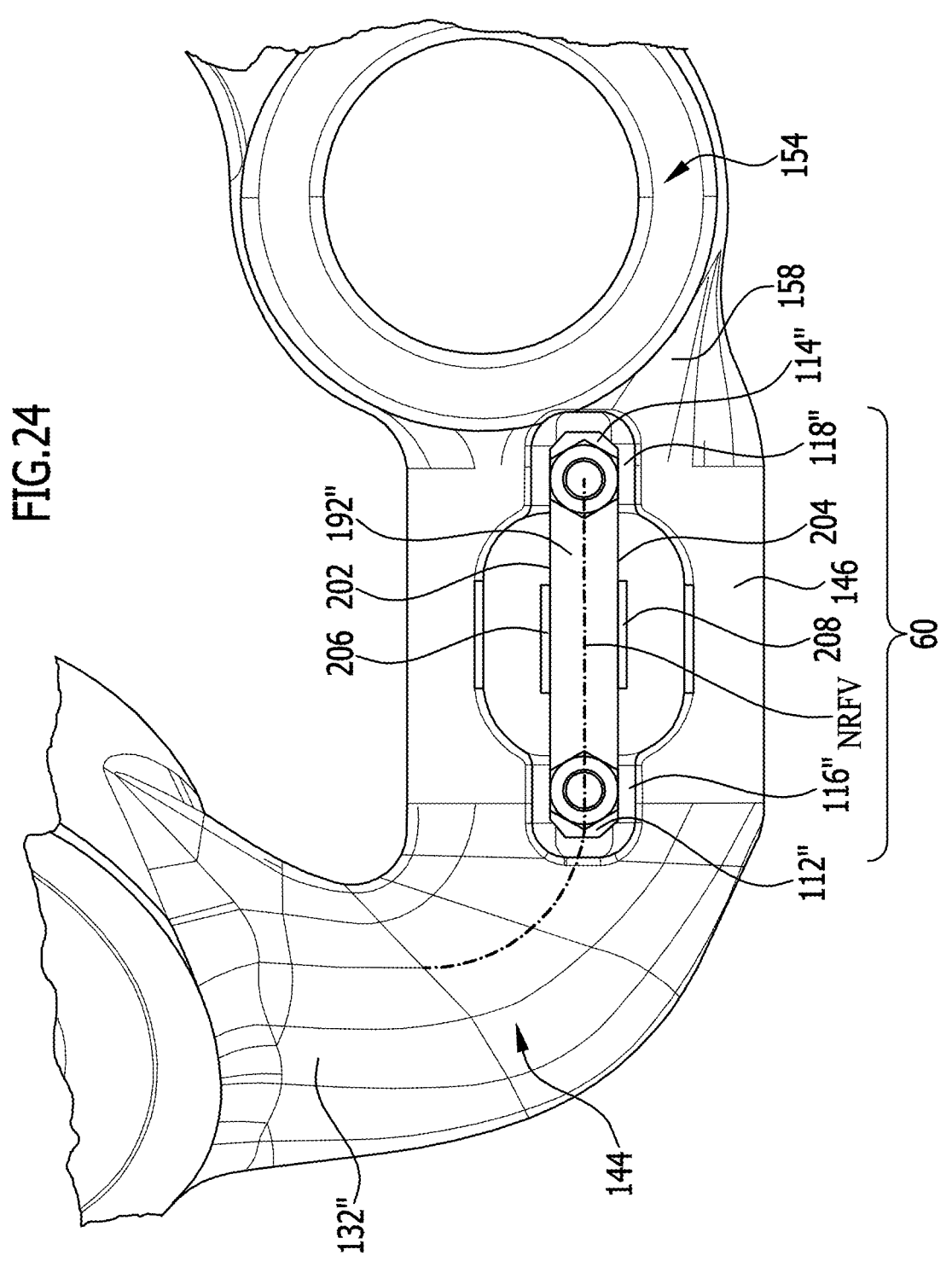
FIG. 24 a lateral plan view of the supporting arm section of the supporting arm in accordance with FIG. 22 and FIG. 25 a section along the line 25-25 in FIG. 23.

In a fifth exemplary embodiment which is illustrated in FIGS. 19 to 21, the supporting arm 130' is, in principle, constructed in the same way as was the case in the third exemplary embodiment although the sensor unit 190' together with the sensor carrier 192 is arranged on the intermediate piece 146 comprising the section 60 of the supporting arm laterally of the intermediate piece 146, but nevertheless in a manner such that the vertical neutral reference surface NRFV intersects the sensor carrier 192' in a central volume region 194' and hence this sensor carrier 192' also comprises sensor carrier surfaces 202 and 204 which are as arranged on oppositely located sides of the neutral reference surface NRFZ in the same way as in the second and fourth exemplary embodiment so that strain sensors 206 and 208 arranged on these sensor carrier surfaces 202 and 204 likewise capture elongations and compressive distortions of the sensor carrier 192' of the same order of magnitude.

Preferably thereby, the sensor carrier 192' is firmly connected at the end regions 212 and 214 thereof to the intermediate piece 146 so that the sensor carrier 192 qualitatively experiences the same reversible deformations as the intermediate piece 144 comprising the section 60 of the supporting arm in a similar manner to that of the second and fourth exemplary embodiment.

This solution has the advantage that no alteration of the supporting arm 130' itself such as by introducing the break-through 80 for example is necessary but rather, the supporting arm 130' can be formed such that the section 60 of the supporting arm itself is unchanged and, for example, can merely be mounted on one side or else on opposite sides of the section 60 of the supporting arm of the sensor carrier 192' in such a way that the vertical neutral reference surface NRFV intersects a central volume region 194' thereof.

Consequently, the reversible deformations of the supporting arm 130' resulting from a vertical force FZ and a horizontal longitudinal force FX are also detectable as elongations in the case of a sensor carrier 192' of this type having strain sensors 206 and 208 arranged on the sensor carrier surfaces 202 and 204.

Thus for example, in the event of a static loading by the force FZ, this can be determined by the strain sensors 206, 208, whereby in the case of the device in accordance with the invention the force FZ represents a hitching-load of a trailer or a load carrying unit that is acting on the element 40 of the supporting arm 130.

Due to the effect of the horizontal longitudinal force FX, the same elongations arise everywhere in the section 60 of the supporting arm so that all the strain sensors 206, 208 capture substantially the self-same material bending stresses MZS.

In particular in the case of the device in accordance with the invention, a horizontal longitudinal force FX of this type represents a tensile force which is acting on the element 40 when the motor vehicle is being driven along, whereby the mass of the trailer acting on the element 40 or of the load carrying unit acting on the element 40 can be determined from this tensile force together with knowledge of the acceleration.

In the fifth exemplary embodiment of the solution in accordance with the invention in particular, there is provided on the sensor carrier 192' an evaluating unit AU which captures the signals of the strain sensors 206, 208 and determines therefrom the hitching-load FZ on the element 40 when the motor vehicle is at rest by, for example consulting a table which associates the signals of the strain sensors with a hitching-load, and thereafter, when it is being driven along, determines the tensile force FX by taking into consideration the measured hitching-load FZ, likewise for example, by consulting a table which links the values for the hitching-load and the signals of the strain sensors when it is being driven along with a value for the tensile force.

Furthermore, there is additionally provided in the evaluating unit AU an acceleration sensor BSH for capturing the acceleration in the horizontal longitudinal direction X so that the evaluating unit AU is also able to determine the mass of a trailer engaging the element 40 or a load carrying unit held on the element 40.

In the fifth exemplary embodiment, those elements which are identical to those of the preceding exemplary embodiments are provided with the same reference symbols so that reference can be made to the disclosure in regard to the preceding exemplary embodiments.

In a sixth exemplary embodiment that is illustrated in FIGS. 22 to 25, those elements that are identical with those of the preceding exemplary embodiments are provided with the same reference symbols so that reference can be made in regard to explanations of these elements to the full content of the expositions in regard to the preceding exemplary embodiments.

In the case of the sixth exemplary embodiment, the supporting arm 130" is again provided with a break-through 180" in the region of the intermediate piece 146 that forms the section 60 of the supporting arm which extends in parallel with the vertical neutral reference surface NRFV and passes through the entire section 60 of the supporting arm in a direction parallel to the vertical neutral reference surface NRFV, namely in a manner such that the vertical neutral reference surface NRFV runs through the break-through 180" whilst the upper flange 182" and the lower flange 184" are effective to provide the requisite stability of the intermediate piece 146 on both sides of the break-through 180".

Sensor units 190" of which each comprises a sensor carrier 192" are inserted into the break-through 180" from both sides, whereby the sensor carrier 192" is likewise arranged in such a manner that a central volume region 194" is cut through by the vertical neutral reference surface NRFV.

Furthermore, each of the sensor carriers 192" is provided with sensor carrier surfaces 202 and 204 which are arranged at substantially the same distance on mutually opposite sides of the vertical neutral reference surface NRFV and are thus able to capture the reversible deformations of the sensor carrier 192".

Figure 25:
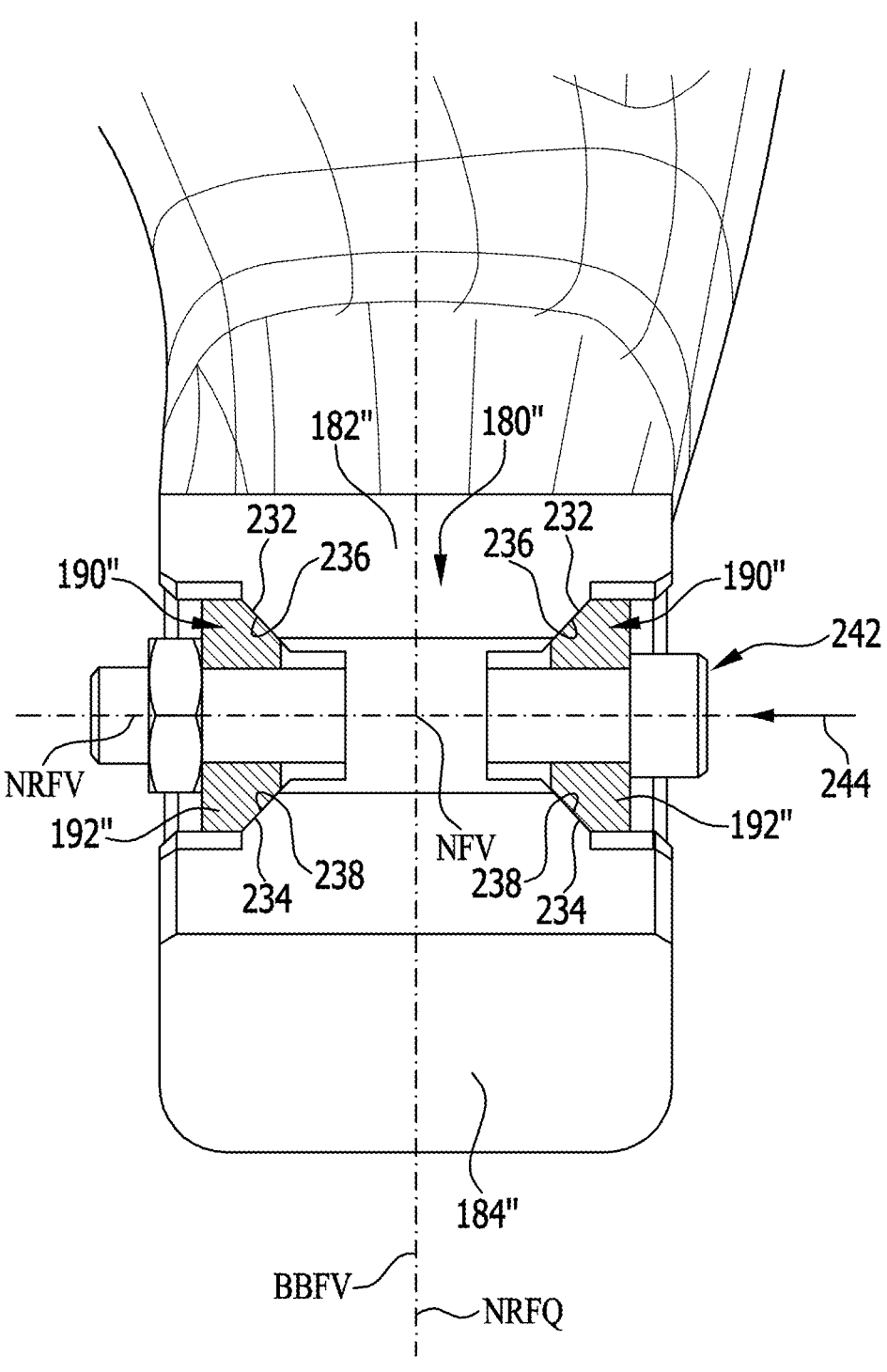

A releasable connection of the sensor carrier 192" to the section 60 of the supporting arm is produced for example by bolting end regions 112" and 114" of the respective sensor carrier 192" to the section 60 of the supporting arm whereby, as is illustrated in FIG. 25, the sensor carriers 192" comprise positive-locking surfaces 232, 234 which are placeable on corresponding seating surfaces 236, 238 in order to establish a positive connection to the section 60 of the supporting arm at the respective end regions 112" and 114" of the sensor carriers 192".

Hereby, the positive-locking surfaces 232 and 234 and the seating surfaces 236 and 238 are arranged in such a way that the end regions 112" and 114" of the sensor carriers 292" are fixable to the section 60 of the supporting arm by a bolted connection 242.

For example, the bolted connection 242 causes the end regions 212" and 114" of the sensor carriers 192" to be pressed into the recesses 116" and 118" in a direction of insertion 244 which runs parallel to the vertical neutral reference surface NRFV for example, whereby the seating surfaces 236 and 238 are each inclined to the direction of insertion 244 and run conically or V-shaped relative to each other.

Furthermore, the positive-locking surfaces 232 and 234 are similarly inclined to the direction of insertion 244 and are oriented in a V-shape relative to each other so that the bolted connection 242 creates a mutually non-rotational positive connection between the recesses 116", 118" and the respective end regions 112" and 114" in order to transmit the reversible deformations of the section 60 of the supporting arm at least qualitatively to the respective sensor carriers 192".

In this exemplary embodiment, the sensor units 190" are separately producible units which, for example, can be replaced in the event of damage and which can also be employed with supporting arms 130" of differing shape.

In this exemplary embodiment, the sensor carrier 192" consists of a material having the same coefficient of thermal expansion as the material of the section 60 of the supporting arm in order to avoid stresses in the sensor carrier 192" with changes of temperature.

In particular, the sensor carrier 192" is made of the same material as the section 60 of the supporting arm.

The fact that in this exemplary embodiment two sensor carriers 192" are arranged on mutually opposite sides but in particular, are offset relative to an outer contour of the section 60 of the supporting arm makes it possible to carry out redundant measurements on mutually opposite sides with the strain sensors 206 and 208 of these sensor units 190".

Moreover, in this exemplary embodiment, the sensor units 190" are arranged on mutually opposite sides of the transverse neutral reference surface NRFQ so that the possibility also exists of capturing reversible deformations in the section 60 of the supporting arm that are produced by the horizontal transverse force FY by means of differing elongations captured by the one sensor unit 190" with respect to the other sensor unit 190".

Thus, for example, in the event of a static load imposed by the force FZ, this can be determined by the strain sensors 206, 208 on the two sensor carriers 192" whereby, in the case of the device in accordance with the invention, the force FZ represents a hitching-load of a trailer or a load carrying unit that is acting on the element 40 of the supporting arm 30.

Thus, in a comparable manner, the respective strain sensors 206, 208 of the two sensor units 190" that are spaced apart from one another are also arranged on mutually opposite sides of the transverse neutral reference plane NRFQ and are arranged relative to a surface region $FB_{NRFQ}$ in such a way that the respective strain sensors 206, 208 of the two sensor units 190" lie within the surface region $FB_{NRFQ}$ in the case of a vertical projection onto the transverse neutral reference surface NRFQ, whereby the surface region $FBN_{RFQ}$ extends in each of the directions of extent thereof lying in the surface region $FB_{NRFQ}$ to an extent which corresponds maximally to 1.5 times the extent of the strain sensors 206, 208 parallel to these directions.

In addition, a vertical projection of the strain sensors 206 and 208 of each of the sensor units 190" also lies within the surface region $FB_{NRFQ}$.

Due to the arrangement of the strain sensors 206, 208 of the two sensor units 190" at approximately the same distance from the transverse neutral reference surface NRFQ, a transverse bending loading BQ likewise engenders signals of opposed prefix sign but in the same order of magnitude and preferably of approximately the same size from the respective strain sensors 206, 208 of the two sensor units 190".

The horizontal transverse force FY determined by the sensors 206, 208 of the two sensor units 190", in particular in the device in accordance with the invention, represents a transverse acceleration on the element 40 which, for example, arises with rolling motions of the motor vehicle or of the motor vehicle with the trailer or with the load carrying unit when the motor vehicle is being driven along.

Due to the effect of the horizontal longitudinal force FX, the same elongations occur everywhere in the section 60 of the supporting arm so that all the strain sensors 206, 208 of the two sensor units 190" capture substantially the same material tensile stresses $MZS_X$ combined with the material bending stresses $MBS_X$ caused by the lever arm H1.

A horizontal longitudinal force FX of this type represents, in particular in the case of the device in accordance with the invention, a tensile force which acts on the element 40 when the motor vehicle is being driven along, whereby the mass of the trailer acting on the element 40 or of the load carrying unit acting on the element 40 can be determined from this tensile force in the knowledge of the acceleration.

In the solution in accordance with the invention in particular, there is provided on one of the sensor carriers 190" an evaluating unit AU which captures the signals of the strain sensors 206, 208 of the two sensor units 190" and determines therefrom the hitching-load FZ on the element 40 when the motor vehicle is at a standstill, for example, by consulting a table which associates the signals of the strain sensors with a hitching-load and thereafter, when it is being driven along, determines the tensile force FX and if necessary the transverse force FY by taking into consideration the measured hitching-load FZ, likewise for example, by consulting a table which links the values for the hitching-load and the signals of the strain sensors 206, 208 with a value for the tensile force when the vehicle is being driven along.

Moreover, an acceleration sensor BSH which captures the acceleration in the horizontal longitudinal direction X is additionally provided in the evaluating unit AU so that the evaluating unit is AU is also able to determine the mass of a trailer engaging the element 40 or of a load carrying unit held on the element 40.

The invention claimed is:

1. A device for pulling a trailer or retaining a load carrying unit that is mountable at the rear end of a motor vehicle body, comprising: a supporting arm which is connected to the vehicle body by a first end region and is provided at a second end region with an element for attaching the trailer and/or for fixing the load carrying unit, and furthermore comprising sensors for capturing reversible deformations of the supporting arm caused by loads on the supporting arm, strain sensors of the supporting arm section which are affected by the reversible deformations thereof capture at least one selected bending load, at least one strain sensor is arranged on one side and at least one strain sensor is arranged on an opposite side of a neutral reference surface of the selected bending load and the strain sensors are each arranged at distances that may be the same or different from the neutral reference surface, each bending load defines a specific neutral reference surface, the supporting arm is subject to a vertical bending load and a transverse bending load, whereby in the case of a vertical bending load the specific neutral reference surface that is formed is a vertical neutral reference surface and in the case of a transverse bending load the specific neutral reference surface that is formed is a transverse neutral reference surface, an evaluating unit is provided which evaluates the signals of the strain sensors, which determines the force acting on the element in the vertical direction and which determines a horizontal transverse force.

2. A device in accordance with claim 1, wherein a vertical projection of each of the strain sensors that are arranged on mutually opposite sides of the neutral reference surface lies on the neutral reference surface.

3. A device in accordance with claim 2, wherein, the vertical projection of each of the strain sensors on the neutral reference surface defines a surface region on the neutral reference surface, wherein in each of the directions of extent thereof, the surface region exhibits an extent which is maximally double the extent of each of the strain sensors parallel to this direction of extent.

4. A device in accordance with claim 1, wherein the strain sensors arranged on mutually opposite sides of the respective neutral reference surface are arranged at distances from the respective neutral reference surface which are such that the distance to the at least one strain sensor on one side of the of the neutral reference surface lies within the range of 0.5 times up to 1.5 times the distance to the at least one strain sensor on the opposite side of the neutral reference surface.

5. A device in accordance with claim 1, wherein the strain sensors are aligned approximately parallel with the neutral reference surface.

6. A device in accordance with claim 1, wherein the strain sensors are arranged on sensor carrier surfaces running approximately parallel to the neutral reference surface and are connected thereto.

7. A device in accordance with claim 1, wherein the selected bending load is caused by a force on the element in the vertical direction and in that the neutral reference surface arising therefrom is a vertical neutral reference surface.

8. A device in accordance with claim 1, wherein the strain sensors are arranged and aligned in such a manner that they capture a horizontal tensile load by a horizontal longitudinal force on the element.

9. A device in accordance with claim 1, wherein the section of the supporting arm is fixed in such a manner that the neutral reference surface of this section of the supporting arm comprises a component in a horizontal longitudinal direction.

10. A device in accordance with claim 9, wherein the neutral reference surface of this supporting section runs substantially parallel to the horizontal longitudinal direction.

11. A device in accordance with claim 1, wherein the supporting arm is a ball neck which, at its second end, carries an element in the form of a coupling ball that serves for attaching a trailer and/or fixing a load carrying unit.

12. A device in accordance with claim 1, wherein a curved piece is provided between an intermediate region of the supporting arm comprising the section of the supporting arm and the first end region and/or the second end region of the supporting arm.

13. A device in accordance with claim 1, wherein the section of the supporting arm lies in a central region between the first end region and the second end region of the supporting arm.

14. A device in accordance with claim 1, wherein the evaluating unit determines a horizontal longitudinal force.

15. A device in accordance with claim 1, wherein the evaluating unit includes an acceleration sensor.

* * * * *